(12) United States Patent
Kuehnle et al.

(10) Patent No.: US 10,922,559 B2
(45) Date of Patent: Feb. 16, 2021

(54) AUTOMATIC SURROUND VIEW HOMOGRAPHY MATRIX ADJUSTMENT, AND SYSTEM AND METHOD FOR CALIBRATION THEREOF

(71) Applicant: Bendix Commercial Vehicle Systems LLC, Elyria, OH (US)

(72) Inventors: Andreas U. Kuehnle, Villa Park, CA (US); Hans M. Molin, Mission Viejo, CA (US); Marton G. Gyori, Budapest (HU); Adam Szoellosi, Muchen (DE)

(73) Assignee: BENDIX COMMERCIAL VEHICLE SYSTEMS LLC, Elyria, OH (US)

( * ) Notice: Subject to any disclaimer, the term of this patent is extended or adjusted under 35 U.S.C. 154(b) by 272 days.

(21) Appl. No.: 15/081,019

(22) Filed: Mar. 25, 2016

(65) Prior Publication Data
US 2017/0277961 A1    Sep. 28, 2017

(51) Int. Cl.
*G06K 9/00* (2006.01)
*H04N 5/232* (2006.01)
(Continued)

(52) U.S. Cl.
CPC ........ *G06K 9/00805* (2013.01); *G06T 3/4038* (2013.01); *G06T 7/80* (2017.01);
(Continued)

(58) Field of Classification Search
None
See application file for complete search history.

(56) References Cited

U.S. PATENT DOCUMENTS 8,269,848 B2 * 9/2012 Kakinami ............... G06T 7/80
                                                      348/222.1
8,885,049 B2  11/2014 Miksch
(Continued)

FOREIGN PATENT DOCUMENTS

| CN | 103192766 A | 7/2013 |
| CN | 103978935 A | 8/2014 |
| WO | 2012139660 A | 10/2012 |

OTHER PUBLICATIONS

ARM, ARM NEON support in the ARM compiler, White Paper, Sep. 2008, 2007, 2008 ARM Limited.
(Continued)

*Primary Examiner* — Mohammed Jebari
(74) *Attorney, Agent, or Firm* — Tucker Ellis LLP

(57) ABSTRACT

An imaging system adjusts a display of images obtained of an area to compensate for one or more relationships of cameras on a vehicle relative to a peripheral area. The system comprises a processor, an image obtaining unit, a non-transient memory, a situational compensation unit, and a display unit. The image obtaining unit receives first image data representative of a first image, and the memory stores intrinsic image coordinate transformation data representative of an intrinsic mapping between the first image data and first display data representative of an uncompensated bird's eye view image of the peripheral area of the associated vehicle. The situational compensation selectively modifies the intrinsic mapping as an adjusted intrinsic mapping between the first image data and the first display data in accordance with a signal representative of the one or more relationships of the associated vehicle relative to the peripheral area.

27 Claims, 18 Drawing Sheets

(51) Int. Cl.
*H04N 5/247* (2006.01)
*H04N 17/00* (2006.01)
*G06K 7/00* (2006.01)
*G06T 3/40* (2006.01)
*G06T 7/80* (2017.01)

(52) U.S. Cl.
CPC ..... *H04N 5/23229* (2013.01); *H04N 5/23238* (2013.01); *H04N 5/247* (2013.01); *H04N 17/002* (2013.01); *G06T 2200/32* (2013.01); *G06T 2207/10004* (2013.01); *G06T 2207/20221* (2013.01); *G06T 2207/30252* (2013.01); *G06T 2207/30261* (2013.01)

(56) References Cited

U.S. PATENT DOCUMENTS

| | | | |
|---|---|---|---|
| 2008/0002023 A1* | 1/2008 | Cutler | G06T 3/4038 348/36 |
| 2008/0181488 A1 | 7/2008 | Hishii et al. | |
| 2008/0231710 A1* | 9/2008 | Asari | H04N 17/002 348/187 |
| 2009/0268027 A1* | 10/2009 | Yang | B60R 1/00 348/148 |
| 2010/0110194 A1 | 5/2010 | Euler et al. | |
| 2011/0115922 A1 | 5/2011 | Shimizu | |
| 2011/0211046 A1 | 9/2011 | Stumber | |
| 2012/0057053 A1* | 3/2012 | Mallon | G01M 11/0264 348/241 |
| 2013/0250114 A1* | 9/2013 | Lu | H04N 5/23238 348/148 |
| 2014/0247354 A1 | 9/2014 | Knudsen | |
| 2015/0009329 A1 | 1/2015 | Ishimoto | |
| 2015/0029338 A1 | 1/2015 | Lee et al. | |
| 2015/0086080 A1 | 3/2015 | Stein et al. | |
| 2016/0140713 A1* | 5/2016 | Martin | H04N 5/3572 382/154 |
| 2016/0264050 A1* | 9/2016 | Karabed | B60R 1/00 |
| 2017/0195564 A1* | 7/2017 | Appia | H04N 5/23238 |
| 2017/0297491 A1* | 10/2017 | Tanaka | B60R 1/00 |
| 2018/0213153 A1* | 7/2018 | Iso | H04N 5/23229 |

OTHER PUBLICATIONS

Mario Bellino, Calibration of an embedded camera for driver-assistant systems, pp. 1-10, Intelligent Transportation Systems, 2005. Proceedings. 2005 IEEE, Switzerland.

* cited by examiner

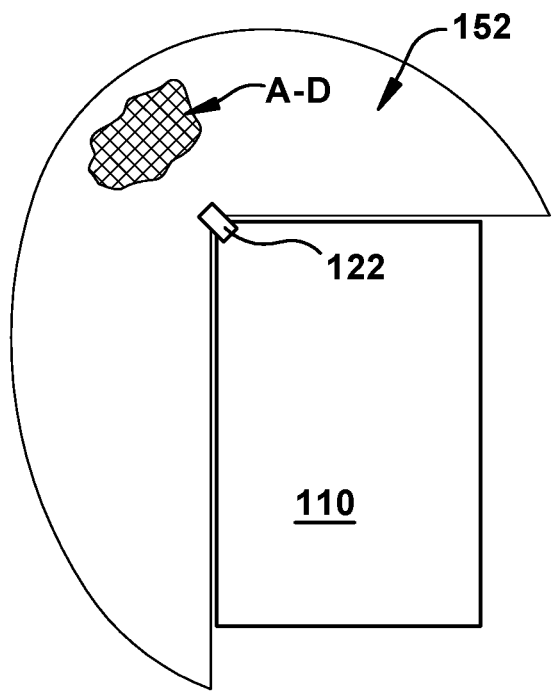
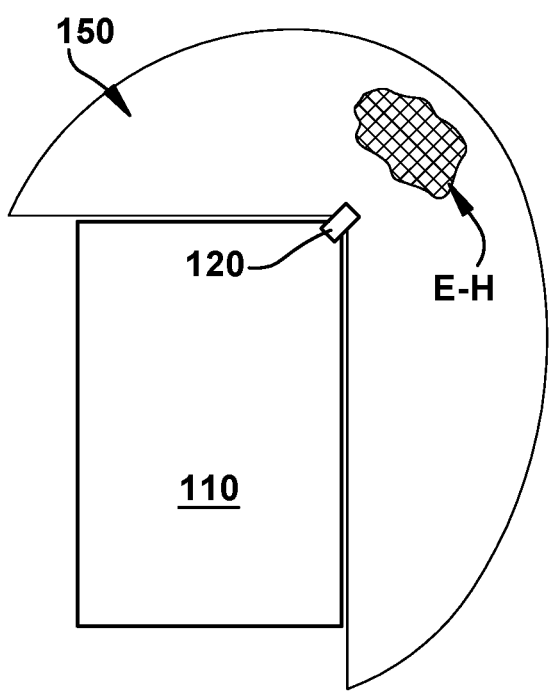
Fig. 1b
Fig. 1c
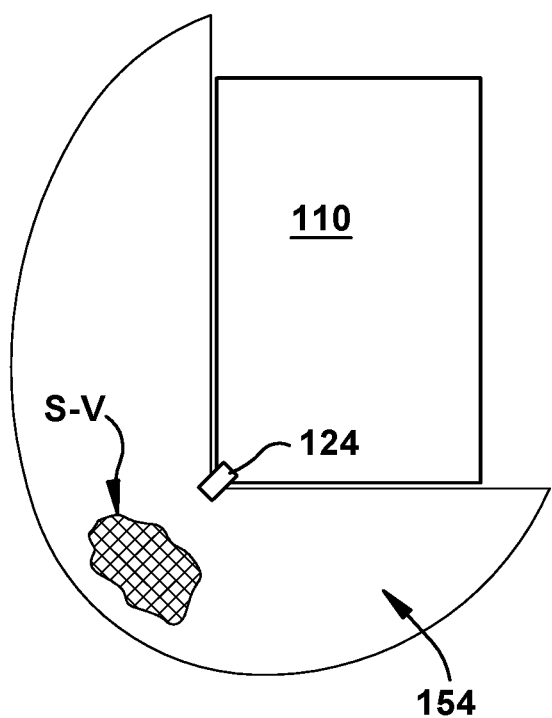
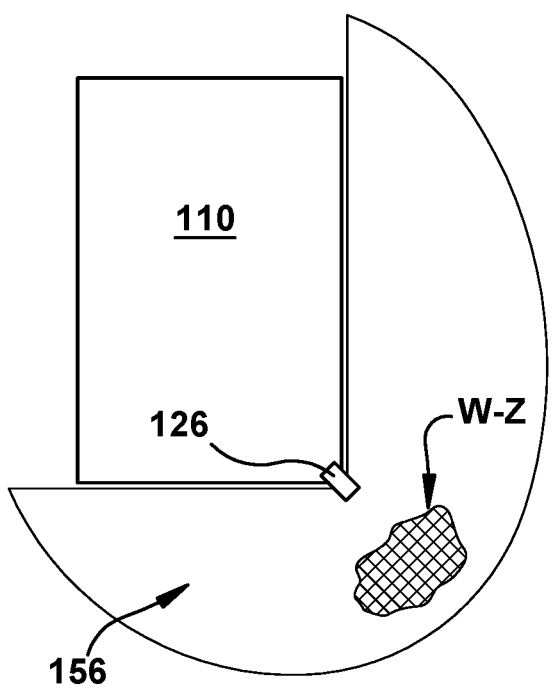
Fig. 1d
Fig. 1e

Output Display - Columns

|  | 24 | 25 | 26 |
|---|---|---|---|
| 400 | 227 679 | 227 679 | 227 679 |
| 401 | 227 680 | 227 680 | 227 680 |
| 402 | 227 680 | 227 681 | 227 681 |
| 403 | 227 681 | 227 681 (W) | 228 681 |
| 404 | 227 682 | 228 682 | 228 682 |
| 405 | 228 682 | 228 682 | 228 682 |
| 406 | 228 683 | 228 683 | 228 683 |
| 407 | 228 684 | 228 684 | 228 684 (X) |
| 408 | 228 684 (Y) | 228 684 | 229 684 |

Output Display - Rows

AUTOMATIC SURROUND VIEW HOMOGRAPHY MATRIX ADJUSTMENT, AND SYSTEM AND METHOD FOR CALIBRATION THEREOF

TECHNICAL FIELD

The embodiments herein relate generally to vision/imaging systems and more specifically to vehicle 360° surround view camera systems providing a bird's eye view of a continuous region surrounding a vehicle during use or operation of the vehicle, and to systems and methods for calibrating and using such 360° surround view camera systems. The example embodiments herein will be described in connection with a 360° surround view camera system using a single system of four (4) corner-placed cameras for a non-articulated cargo truck, and to static calibration systems and methods using synthetic vehicle displacement techniques. However, it is to be appreciated that the embodiments are not limited to these applications, but also find use in many other applications including for example surround view camera system dynamic calibration systems and methods, and to vision/imaging systems for multiple articulated cargo trucks and other apparatus using any number of one or more cameras placed anywhere on the vehicle, and to dynamic and/or static calibration systems therefor and methods thereof.

BACKGROUND

It is common to place cameras on vehicles for purposes of providing one or more images of areas surrounding the vehicle to an operator. This helps to improve the awareness of the operator relative to conditions near the vehicle for avoiding collisions and to assist in maneuvering the vehicle for parking or movement near loading docks or the like. For these reasons and for purposes of attempting to provide a "surround view" of the area around the vehicle, cameras have been located at various positions on the vehicle such as for example at the front end, rear, left side, and right side. These cameras offer the operator various views relative to the vehicle including forward, rear, left and right views. In some applications, the set of individual and separately obtained views are combined by abutting or "stitching" the set of views into a single contiguous or uninterrupted surround view image for visualization on a dashboard display or the like of the vehicle, thereby providing a live panoramic or 360° bird's eye view of the vehicle in its current setting for the convenience of the operator.

Steps of obtaining the original images, correcting for lens distortion, combining the several views provided by the separate cameras, and converting the overhead camera views by a plane projective transformation with a homography matrix or the like into the bird's eye view suitable for human visualization are complicated and time consuming, even when high speed electronic processing systems are used. For this reason, some systems use one or more dedicated pixel transformation tables such as, for example, a pixel transformation table for carrying out a lens distortion correction, and another pixel transformation table for carrying out a viewpoint change operation. Tables such as these may be stored in a memory in advance as a look up table (LUT) and are useful to generally describe the relationship between addresses or locations of the pixels in the distorted image before a lens distortion correction transformation, and the addresses or locations of the pixels after the lens distortion correction and viewpoint change transformations.

Although a dedicated precomputed transformation table that is created and stored in advance in a memory of a vision system, for example, might offer computational advantages over brute force matrix math performed on the fly, the inherent inflexibility of this hardwired solution renders the overall results to be somewhat limited relative to the full range of potential operating conditions of the vehicle. For example, vehicle loading, wear, roll, pitch, and other operating conditions introduce complicating factors affecting the processing of the image to be rendered to the vehicle operator beyond the capabilities of current imaging systems including those with dedicated transformation tables.

It is therefore desirable to provide a vehicle 360° surround view system without these limitations and which provides realistic life-like images to a vehicle operator during operation of the vehicle through the full range of potential operating conditions of the vehicle without introducing any mis-registration artifacts or other confusion into the image. In particular, it is desirable to provide a vehicle surround view system having one or more cameras placed on a vehicle that can quickly accommodate normal vehicle operating parameters including but not limited to vehicle pitch, vehicle roll, vehicle loading, vehicle wear, suspension position, vehicle height relative to the ground, and other operating conditions. It is further desirable to provide systems and methods for easily and efficiently calibrating and using such surround view system.

BRIEF SUMMARY OF EXAMPLE EMBODIMENTS

In accordance with an example embodiment herein, a vehicle view system includes a camera located at a predetermined position on the vehicle wherein the field of view of the camera provides an area of a field of view adjacent the vehicle carrying the cameras. Further in accordance with the embodiment, a system and method for calibrating the vehicle view system described above are provided determining calibration parameters of the vehicle view system, and selectively adjusting the calibration parameters for motion and other relationships of the vehicle relative to the environment of the vehicle during use thereof.

In accordance with a further example embodiment herein, a vehicle 360° surround view system includes a set of two (2) or more cameras located at predetermined positions on the vehicle wherein the field of view of each camera overlaps the field of view of at least one other camera of the set of two (2) or more cameras, thereby providing a continuous area of overlapping fields of view completely surrounding the vehicle carrying the cameras. Further in accordance with the embodiments herein, systems and methods for calibrating the vehicle 360° surround view system described above are provided and for adjusting the calibration parameters for motion and other relationships of the vehicle relative to the environment of the vehicle during use thereof.

In another embodiment, an imaging system adjusts a display of images obtained of a peripheral area adjacent to an associated vehicle to compensate for one or more relationships of the associated vehicle relative to the peripheral area. The system comprises a processor, an image obtaining unit, a non-transient memory, a situational compensation unit, and a display unit. The image obtaining unit is operatively coupled with the processor and is configured to receive first image data representative of a first image of the peripheral area adjacent to the associated vehicle. The non-transient memory is operatively coupled with the processor, and stores intrinsic image coordinate transformation data representative of an intrinsic mapping between the first image data and first display data representative of an uncompensated bird's eye view image of the peripheral area of the associated vehicle. The intrinsic image coordinate transformation data includes but is not necessarily limited to homography data, lens distortion data, and the like. The situational compensation unit is operatively coupled with the processor and the non-transient memory, and is configured to selectively modify the intrinsic mapping as an adjusted intrinsic mapping between the first image data and the first display data in accordance with a signal representative of the one or more relationships of the associated vehicle relative to the peripheral area. The display unit is configured to display on a human readable output the first display data mapped to the first image data in accordance with the adjusted intrinsic mapping.

The vision/imaging systems and methods and apparatus for calibrating the vision/imaging systems of the example embodiments are advantageous over traditional devices in many ways including that the embodiments herein minimize the errors in the image displayed to the driver owing to motion or other loading factors of the vehicle to provide a clear and complete composite image, while also providing a wide range of imaging and calibration options and enhancements.

Additional advantages and features of the embodiments herein will become apparent from the following description and appended claims, taken in conjunction with the accompanying drawings.

BRIEF DESCRIPTION OF THE DRAWINGS

The foregoing and other features of the embodiments herein will become apparent to those skilled in the art to which the present surround view systems, calibration systems, and calibration methods relate, upon reading the following description with reference to the accompanying drawings, in which:

FIGS. 1b-1e are schematic top plan views showing a field of view of each camera installed in the vehicle of FIG. 1a;

FIG. 12b is a diagram of a portion of a LUT in accordance with the numerical example embodiment of FIG. 12a;

DETAILED DESCRIPTION OF EXAMPLE EMBODIMENTS

Figure 1A:
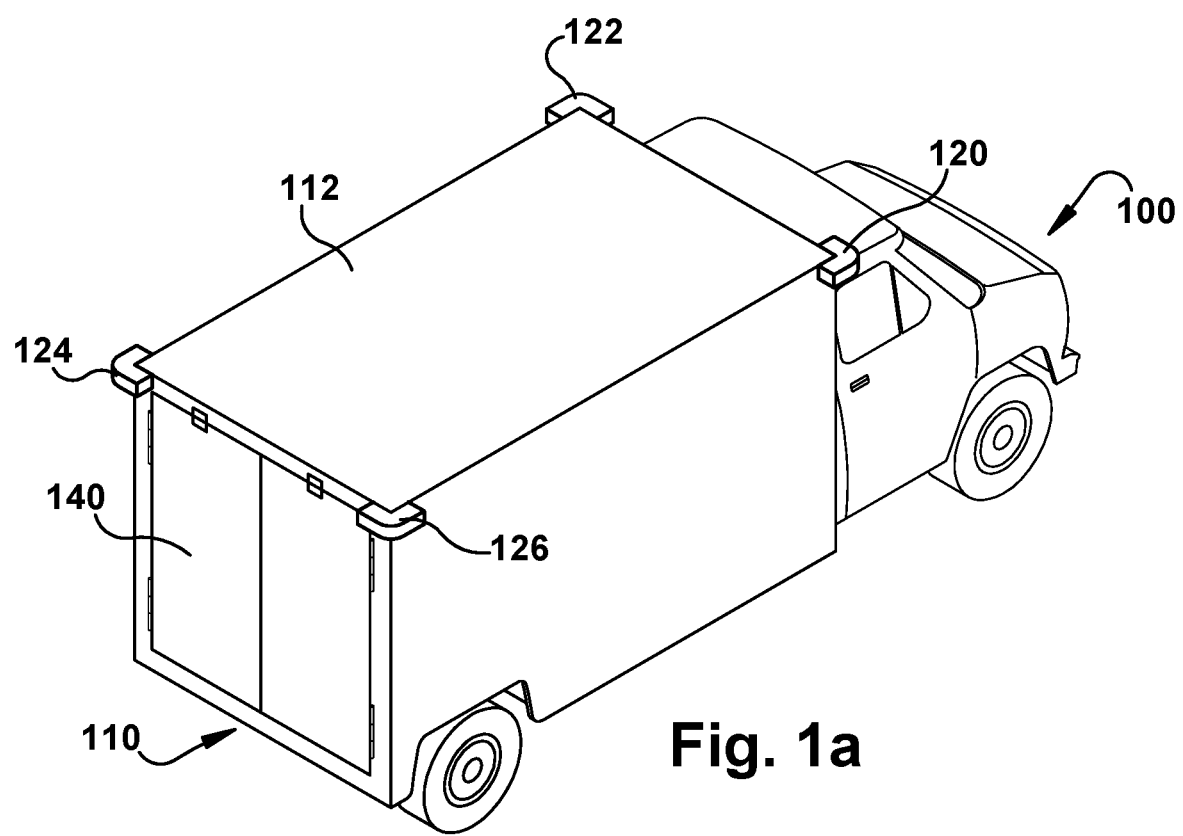
FIG. 1a is a perspective view of a vehicle in which a 360° surround view camera system according to an example embodiment is applied, showing an installation condition of each camera being located at corners of a nominally rectangular delivery truck vehicle.

With reference now to the drawing Figures, wherein the showings are for purposes of describing the embodiments only and not for purposes of limiting same, example embodiments herein relate to a surround view camera system 100 for vehicles having cameras placed at selected positions on the vehicles, and to systems and methods for calibrating the surround view camera systems. The embodiments herein are also applicable to the placement of the cameras at various positions on the vehicles such as, for example, at the corners of the vehicles, and at corners of various one or more substantially rectangular portions of the vehicles. It is to be appreciated that the embodiments herein are applicable to many different camera placement schemes and to many different cameras having various fields of view, resolution, and other characteristics as may be necessary or desired.

Figure 1F:
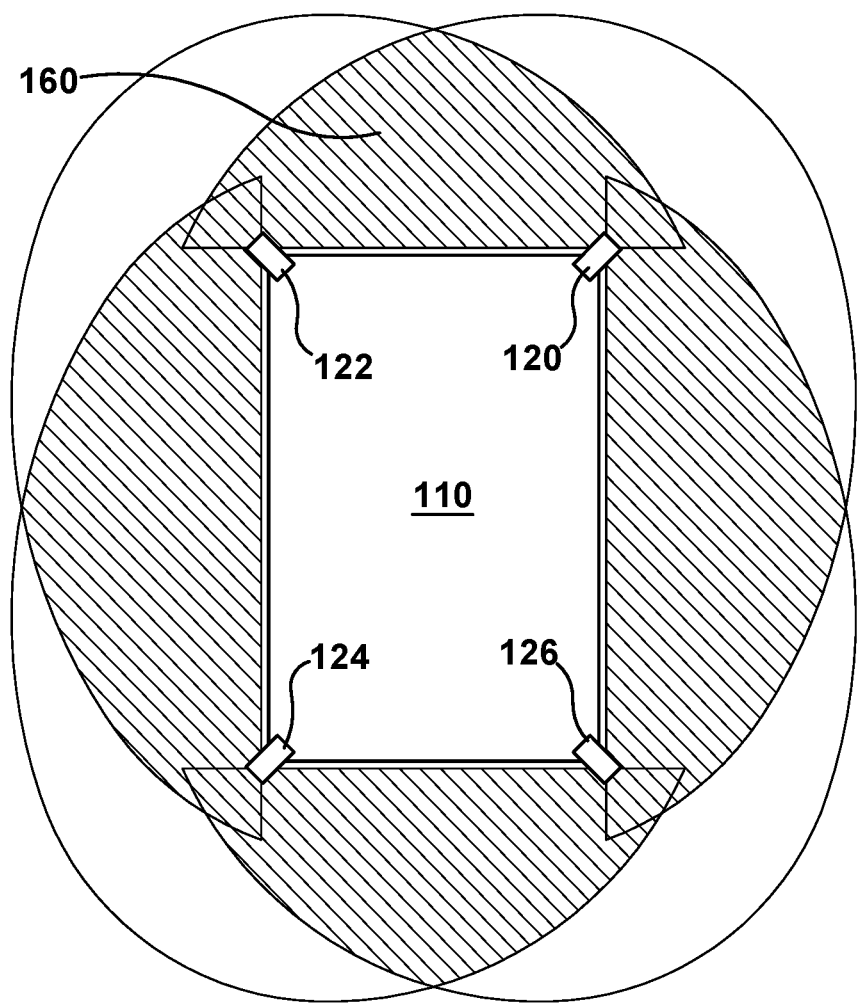
FIG. 1f is a schematic top plan view showing a composite of the fields of view of each camera installed in the nominally rectangular delivery truck vehicle of FIG. 1a put together.

As representative of the embodiments and with reference in particular first to FIG. 1a, the perspective top view shown there illustrates a vehicle 110 in which a 360° surround view camera system 100 according to an embodiment is applied, showing an arrangement of cameras 120, 122, 124, and 126 supported at selected positions on the body 140 of the vehicle 110. FIGS. 1b-1e are schematic top plan views showing a field of view of each camera 120, 122, 124, and 126 installed on the body 140 of the vehicle 110 of FIG. 1a, and FIG. 1f is a schematic top plan view showing a composite construction of the fields of view of the cameras installed in the vehicle of FIG. 1a put together and illustrating overlapping fields of view of the set of cameras of FIG. 1a.

Although a basic delivery panel-type truck 112 is shown as the vehicle 110 in FIGS. 1a-1f, the vehicle 110 can be any other vehicle such as a regular passenger automobile or any other type of mobile apparatus having an overall generally rectangular shape. Also, of course the illustrated panel-type truck 112 vehicle 110 illustrated is configured to be located on and move relative to the ground such as a road surface or the like, other vehicles that would be benefited by the surround view camera system 100 of the various embodiments herein include various robotic devices such as automatic guided vehicles (AGVs) configured to be located on and move relative to the floor of a factory or manufacturing facility or the like. In the following explanations, the ground is assumed to be a horizontal plane and the "height" of these cameras indicates a height with respect to the ground.

As shown in FIG. 1a, cameras (image pickup devices) 120, 122, 124, and 126 are mounted at the uppermost parts of the vehicle 110. The first camera 120 is placed for example at a right uppermost forward part of the vehicle 110, the second camera 122 is placed for example at the left uppermost forward part of the vehicle 110, the third camera 124 is placed for example at the left uppermost rearward part of the vehicle 110, and the fourth camera 126 is placed for example at the right uppermost rearward part of the vehicle 110. The cameras 120-126 may simply be referred to herein and below in this and in the embodiments to be described as "the cameras" or "each camera" without necessarily being distinguished from each other. Although the cameras are arranged as shown, their positions may equivalently be exchanged as may be necessary or desired in accordance with the embodiments into several relative positions such as, for example, by locating the first camera 120 at the left uppermost forward part of the vehicle 110, and locating the second camera 122 at the right uppermost rearward part of the vehicle 110.

It is to be appreciated that the cameras 120-126 are arranged on the vehicle 110 such that the optical axes of the cameras are directed obliquely downward at an angle of about 15°-45° relative to an axis perpendicular to the ground plane under the vehicle. To that end, the optical axis of the first camera 120 is directed obliquely downward at an angle of about 15°-45° towards the right forward direction of the vehicle 110, an optical axis of the second camera 122 is directed obliquely downward at an angle of about 15°-45° towards the left forward direction of the vehicle 110, an optical axis of the third camera 124 is directed obliquely downward at an angle of about 15°-45° towards the left backward direction of the vehicle 110, and an optical axis of the fourth camera 126 is directed obliquely downward at an angle of about 15°-45° towards the right backward direction of the vehicle 110. It is to be further appreciated that the field of view of each camera, i.e. spatial region of which each camera can capture an image, is generally hemispherical in overall shape and is quite large. More particularly, in the example embodiment illustrated, the cameras 120-126 each have a field of view of about 360° and are commonly referred to in the industry as "fish eye" lens cameras or imagers. The cameras 120-126 may for example be of the type Blue Eagle DC3K-1-LVD available from Silicon Micro Systems, or any similar cameras available from other sources and having the desired characteristics of the embodiments.

FIGS. 1b-1e are schematic top plan views showing a field of view of each camera 120, 122, 124, and 126 installed on the vehicle 110 of FIG. 1a. Although a panel-type delivery van 112 having a nominally rectangular overall shape is shown as the vehicle 110 in FIGS. 1a-1f, the vehicle 110 can be any other vehicle such as a regular passenger automobile or any other type of mobile apparatus such as for example an AGV having an overall generally rectangular shape and including a set of camera mounts or other similar devices suitable for supporting the cameras 120, 122, 124, and 126 in an elevated position relative to the vehicle 110. Also, it is to be appreciated that the vehicle 110 is configured to be located on and move relative to the ground such as a road surface or a parking lot adjacent other vehicles, loading docks, or the like. In the following explanations, the ground is assumed to be a horizontal plane and the "height" of these cameras indicates a height with respect to the ground.

As shown in FIG. 1a, cameras (image pickup devices) 120, 122, 124, and 126 are mounted at uppermost parts of the vehicle such as, for example, at the corners of the vehicle 110. FIG. 1b shows the usable field of view 152 of the second camera 122 viewed from above, in other words, the generally hemispherical field of view of the left and forward directed second camera as projected onto the generally planar ground surface at the left front of the vehicle 110. Similarly, FIG. 1c shows the usable field of view 150 of the first camera 120 viewed from above, in other words, the generally hemispherical usable field of view of the right and forward directed first camera as projected onto the ground surface at the right front of the vehicle 110. FIG. 1d shows the usable field of view 154 of the third camera 124 viewed from above, in other words, the generally hemispherical field of view of the left and rearward directed third camera as projected onto the generally planar ground surface at the left rear of the vehicle 110. Lastly, FIG. 1e shows the usable field of view 156 of the fourth camera 126 viewed from above, in other words, the generally hemispherical field of view of the right and rearward directed fourth camera as projected onto the ground surface at the right rear of the vehicle 110. It is of course to be appreciated that the remaining portions of the generally hemispherical fields of view of the left and forward directed second camera 122, the right and forward directed first camera 120, the left and rearward directed third camera 124, and the right and rearward directed fourth camera 126 are, in general, partially obstructed by the gross rear shape of the vehicle 110 in that region.

FIG. 1f shows a schematic view in which all of the fields of view as shown in FIGS. 1b-1e are put together. It is to be appreciated that, in the illustrated embodiment, the left and forward directed second camera 122 primarily captures an image of a subject or object, including the road surface, located within a predetermined region in front and to the left of the vehicle 110. Further, the right and forward directed first camera 120 primarily captures an image of a subject or object, including the road surface, located within a predetermined region in front and to the right of the vehicle 110. Still further, the left and rearward directed third camera 124 primarily captures an image of a subject or object, including the road surface, located within a predetermined region in the rear and to the left of the vehicle 110. Yet still further, the right and rearward directed fourth camera 126 primarily captures an image of a subject or object, including the road surface, located within a predetermined region in the rear and to the right of the vehicle 110.

The fields of view 150, 152, 154, and 156 of the cameras 120, 122, 124, and 126 however, overlap forming a continuous region 160 of overlapping fields of view substantially surrounding the vehicle 110. This region 160 is often referred to as a common or continuous overlapping field of view. In FIG. 1f, the common fields of view are shown as the shaded area. In this embodiment, overall, the fields of view 150, 152, 154, and 156 overlap at a common or overlapping continuous field 160 essentially forming a complete uninterrupted ring around the vehicle from corner to corner including views directed towards the obliquely left-forward of the vehicle 152; towards the obliquely right-forward of the vehicle 150; towards the obliquely left-rearward of the vehicle 154; and towards the obliquely right-rearward of the vehicle 156.

Figure 1G:
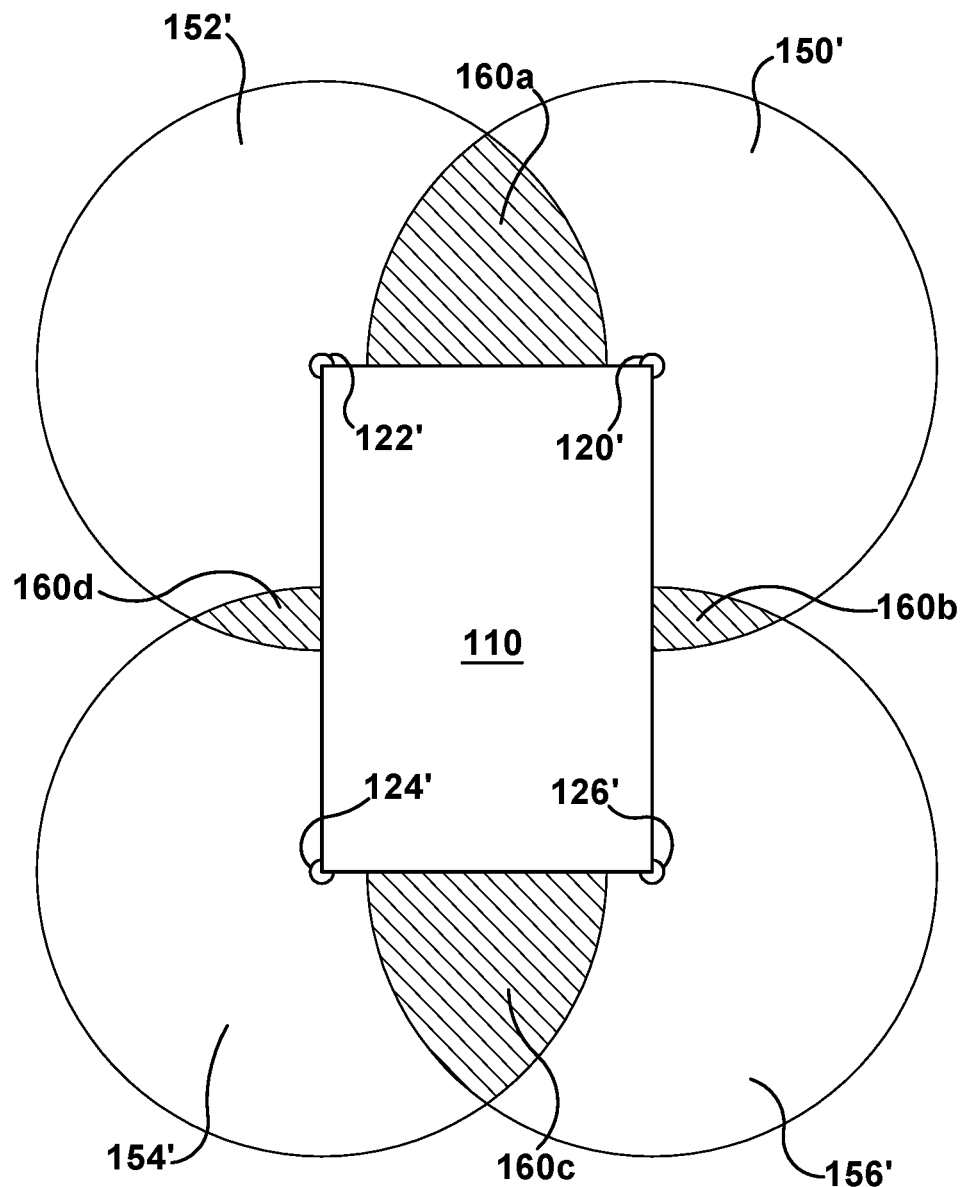
FIG. 1g is a schematic top plan view in accordance with a further example embodiment showing a composite of the fields of view of a set of cameras having different characteristics from the cameras of FIGS. 1a-1f installed in the nominally rectangular delivery truck vehicle of FIG. 1a put together.

FIG. 1g is a schematic top plan view in accordance with a further example embodiment showing a composite of the fields of view of a set of cameras having different characteristics from the cameras of FIGS. 1a-1f installed in the nominally rectangular delivery truck vehicle of FIG. 1a put together. As shown in FIG. 1g, cameras (image pickup devices) 120', 122', 124', and 126' are mounted at uppermost parts of the vehicle such as, for example, at the corners of the vehicle 110. FIG. 1g shows the usable field of view 152' of the second camera 122' viewed from above, in other words, the generally hemispherical field of view of the left and forward directed second camera as projected onto the generally planar ground surface at the left front of the vehicle 110. FIG. 1g also shows the usable field of view 150' of the first camera 120' viewed from above, in other words, the generally hemispherical usable field of view of the right and forward directed first camera as projected onto the ground surface at the right front of the vehicle 110. FIG. 1g further shows the usable field of view 154' of the third camera 124' viewed from above, in other words, the generally hemispherical field of view of the left and rearward directed third camera as projected onto the generally planar ground surface at the left rear of the vehicle 110. Lastly, FIG. 1g shows the usable field of view 156' of the fourth camera 126' viewed from above, in other words, the generally hemispherical field of view of the right and rearward directed fourth camera as projected onto the ground surface at the right rear of the vehicle 110. It is of course to be appreciated that the remaining portions of the generally hemispherical fields of view of the left and forward directed second camera 122', the right and forward directed first camera 120', the left and rearward directed third camera 124', and the right and rearward directed fourth camera 126' are, in general, partially obstructed by the gross rear shape of the vehicle 110 in that region.

The fields of view 150', 152', 154', and 156' of the cameras 120', 122', 124', and 126' of the embodiment illustrated however, overlap forming a set of discontinuous regions 160a, 160b, 160c, and 160d of overlapping fields of view substantially surrounding the vehicle 110. These regions 160a, 160b, 160c, and 160d will be referred to herein, for ease of description, as a common, continuous, or discontinuous overlapping field of view. In FIG. 1g, the common fields of view are shown as the shaded areas 160a, 160b, 160c, and 160d. In this embodiment, overall, the fields of view 150', 152', 154', and 156' overlap at common or overlapping discontinuous fields 160a, 160b, 160c, and 160d essentially forming an interrupted ring around the vehicle from corner to corner. The fields of view 150', 152', 154', and 156' include or otherwise define an overlapping view 160a directed towards the forward of the vehicle 110, an overlapping view 160b directed towards the right of the vehicle 110, an overlapping view 160c directed towards the rear of the vehicle 110, and an overlapping view 160d directed towards the left of the vehicle 110.

Figure 2:
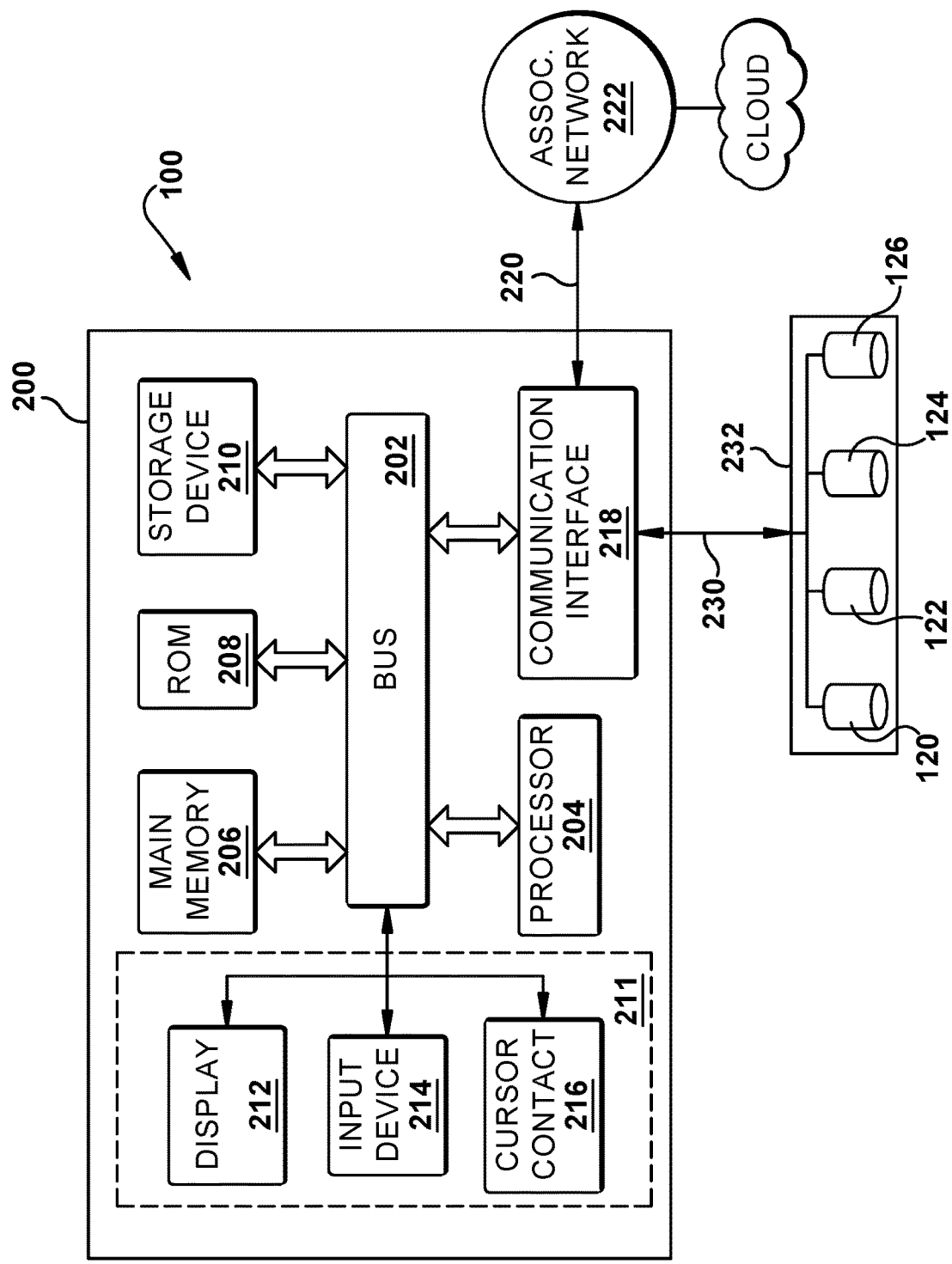
FIG. 2 is a block diagram that illustrates a computer system suitable for supporting and executing the functionality of the example embodiments herein, and upon which the example embodiment may be implemented.

FIG. 2 illustrates an example of a computer system 200 upon which an example embodiment may be implemented. Computer system 200 is suitable for implementing the functionality of any embodiment of the surround view camera system 100 described herein including the static calibration using synthetic vehicle movement, and the example embodiment illustrated in FIGS. 1a-1f.

Computer system 200 includes a bus 202 or other communication mechanism for communicating information and a processor 204 coupled with bus 202 for processing information. Computer system 200 also includes a main memory 206, such as random access memory (RAM) or other dynamic storage device coupled to bus 202 for storing information and instructions to be executed by processor 204. Main memory 206 also may be used for storing temporary or permanent variables, tables such as LUTs or any other data such as intermediate information created and/or used during execution of instructions to be executed by processor 204. Computer system 200 further includes a read only memory (ROM) 208 or other static storage device coupled to bus 202 for storing static information and instructions for processor 204. A storage device 210, such as a magnetic disk, optical disk, SD memory and/or flash storage, is provided and coupled to bus 202 for storing information and instructions.

Computer system 200 may be coupled via bus 202 to a user interface 211. The user interface 211 may comprise a display 212, such as a cathode ray tube (CRT) or liquid crystal display (LCD), for displaying information to a user of the vehicle 100 described above in connection with the example embodiment. The user interface 211 may further comprise an input device 214, such as a keyboard including alphanumeric and other keys. The user interface 211 is coupled to bus 202 for communicating information and command selections to the processor 204. Another type of user input device is cursor control 216, such as a mouse, a trackball, cursor direction keys, and/or a touchscreen for communicating direction information and command selections to processor 204 and for controlling cursor movement on display 212. This input device typically has two degrees of freedom in two axes, a first axis (e.g., x) and a second axis (e.g., y) that allows the device to specify positions in a plane.

An aspect of the example embodiment is related to the use of computer system 200 to implement the vehicle 360° surround view camera system 100 of the example embodiments herein to provide a bird's eye view of a continuous region surrounding a vehicle such as a cargo truck during use of the vehicle under various conditions, and to provide a system and methods for calibrating such 360° surround view camera system. According to an example embodiment, vehicle 360° surround views and calibration steps are provided by the computer system 200 in response to the processor 204 executing one or more sequences of one or more instructions contained in main memory 206. Such instructions may be read into main memory 206 from another computer-readable medium, such as storage device 210. Execution of the sequence of instructions contained in main memory 206 causes processor 204 to perform process steps including the process steps described herein. One or more processors in a multi-processing arrangement may also be employed to execute the sequences of instructions contained in main memory 206. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to the processor 204 for execution. Such a medium may take many forms, including but not limited to non-volatile media, and volatile media. Non-volatile media include, for example, optical or magnetic disks, such as storage device 210. Volatile media include dynamic memory, such as main memory 206. As used herein, tangible media may include volatile and non-volatile media. Common forms of computer-readable media include, for example, floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Various forms of computer-readable media may be involved in carrying one or more sequences of one or more instructions to processor 204 for execution. For example, the instructions may initially be borne on a magnetic disk of a remote computer. The remote computer can load the instructions into its dynamic memory and send the instructions over a telephone line using a modem. A modem local to computer system 200 can receive the data on the telephone line and use an infrared transmitter to convert the data to an infrared signal. An infrared detector coupled to bus 202 can receive the data carried in the infrared signal and place the data on bus 202. Bus 202 carries the data to main memory 206 from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling computer system 200 to a VPN link 220 that is connected to an Enterprise or other predefined network 222. In an example embodiment, VPN link 220 is a wireless link. The communication interface 218 also provides a two-way data communication coupling the computer system 200 with a video link 230 that is connected with a camera set 232 including two (2) or more cameras. In the example embodiments herein, the two (2) or more cameras include for example the cameras 120, 122, 124, and 126 of the example embodiment shown in FIGS. 1a-1f.

Figure 3:
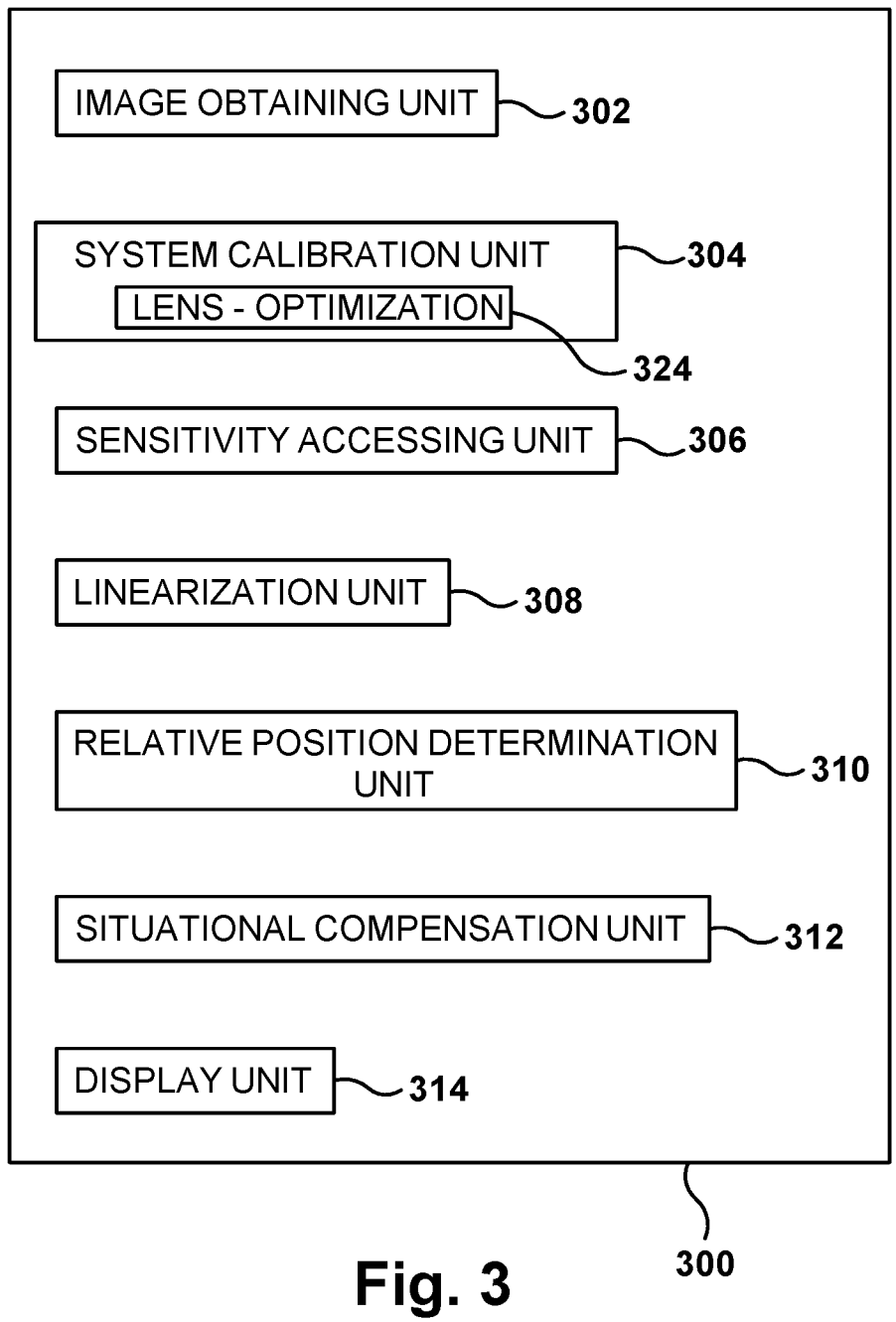
FIG. 3 is a block diagram of a set of code modules stored in a memory of the computer system of FIG. 2 and executable by a processor of the computer system for optimizing and calibrating the cameras of the 360° surround view system and adjusting the camera images to compensate for motion of the vehicle during use of the vehicle according to the example embodiment.

FIG. 3 is a block diagram of a processing module set 300 comprising plural inter-operative processing modules or units for carrying out the functions of the example embodiment herein. It is to be appreciated that each of the plural processing modules or units forming the processing module set 300 are implemented in hardware, software, or combinations of hardware and software in accordance with the example embodiment. The modules or units forming the processing module set 300 may be conveniently implemented using one or more conventional general purpose or specialized digital computers, computing devices, machines, or microprocessors, including one or more processors, memory and/or computer readable storage media programmed according to the teachings of the present disclosure. Appropriate software coding can readily be prepared by skilled programmers based on the teachings of the present disclosure, as will be apparent to those skilled in the software arts. In some embodiments, the modules or units forming the processing module set 300 may include a computer program product which is a storage medium or computer readable medium (media) having instructions stored thereon/therein which can be used to program a computer to perform any of the processes of the example embodiment. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The processing module set of the example embodiment includes, for example, an image obtaining unit 302, an imaging system calibration unit 304, an imaging system sensitivity processing module 306, an imaging system linearization module 308, a vehicle relative position determination module 310, an imaging system situational compensation unit 312, and a display unit module 314. Each of the modules 302, 304, 306, 308, 310, 312, and 314 is executable alone and/or in combination with others of the modules by the processor 204 described above in connection with FIG. 2. In accordance with the example embodiment, the processor of the surround view camera system 100 is configured to execute software code and perform a function of obtaining images of areas surrounding the vehicle 110. In the example embodiment, the image obtaining unit 302 is operatively coupled with the processor 204 and is configured to receive first image data representative of a first image of one or more peripheral areas 150, 152, 154, 156, 160 adjacent to the vehicle 110. In accordance with the example embodiment, the situational compensation unit 312 is operatively coupled with the processor 204 (FIG. 2) and the non-transient memory 206, 208, and 210, and is configured as will be described in greater detail below to selectively modify an intrinsic mapping as an adjusted intrinsic mapping between obtained image data and display data output on the display 212 in accordance with a signal representative of one or more relationships of the associated vehicle relative to the area peripheral to the vehicle. The display unit module 314 is configured to display on a human readable output 212 first display data mapped to first image data in accordance with the adjusted intrinsic mapping.

In the example embodiment, the system calibration unit 304 is configured to calibrate each of the cameras 120, 122, 124, and 126 relative to the associated vehicle 110. The system calibration unit 304 comprises functional modules including a lens distortion scaling optimization module 324 for individually calibrating each of the cameras to correct their respective lens (typically fish-eye) distortion and/or image bowing caused by the inherent physical construction and other intrinsic one or more properties of the fish eye cameras used in the example embodiments. In accordance with the example embodiment, the processor 204 of the surround view camera system 100 executes the lens distortion scaling optimization module 324 for making adjustments to nominal lens distortion parameter values provided by a manufacturer of the fish eye cameras of the embodiments herein.

Figure 4:
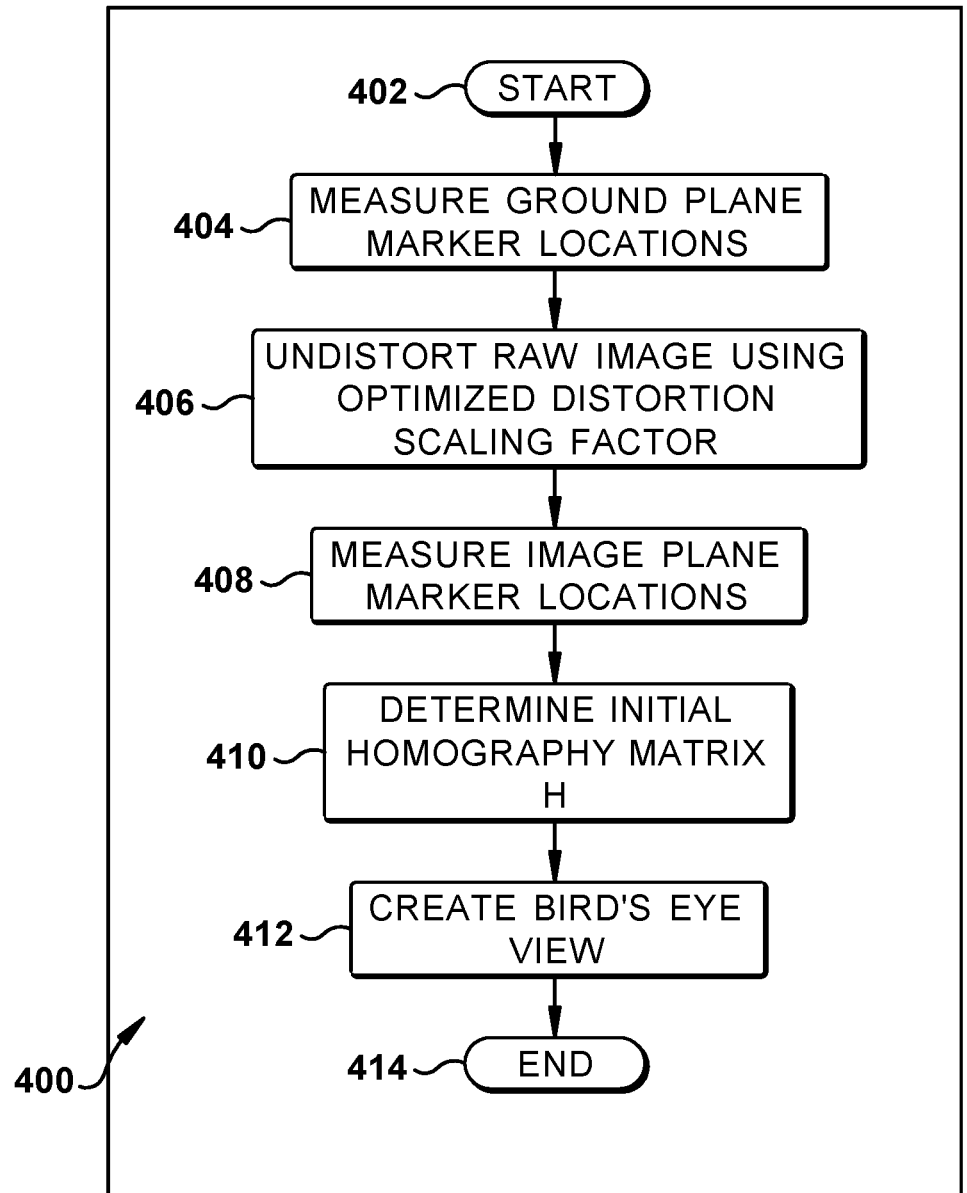
FIG. 4 is a flow chart illustrating a method for calibration of individual cameras of the 360° surround view systems of the example embodiments by optimizing homography matrix parameters of the cameras.
Figure 4A:
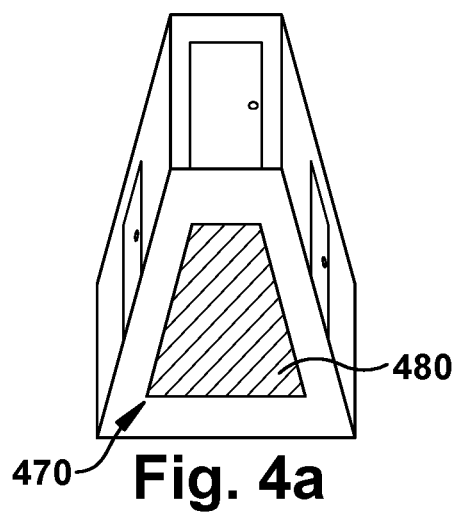
FIGS. 4a-4c are schematic perspective views of an image of a square object disposed on the floor of a fictitious hallway graphically illustrating in simple terms a progression of the skew distortion optimization set out in FIG. 4.
Figure 4B:
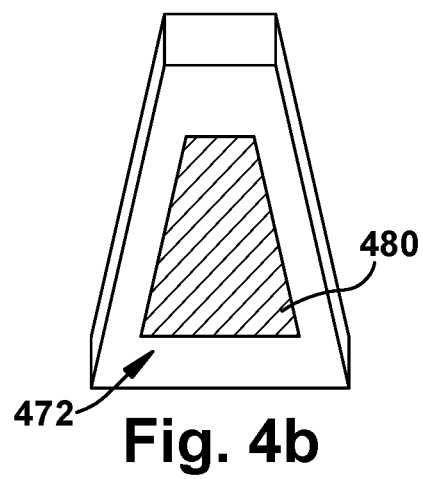
Figure 4C:
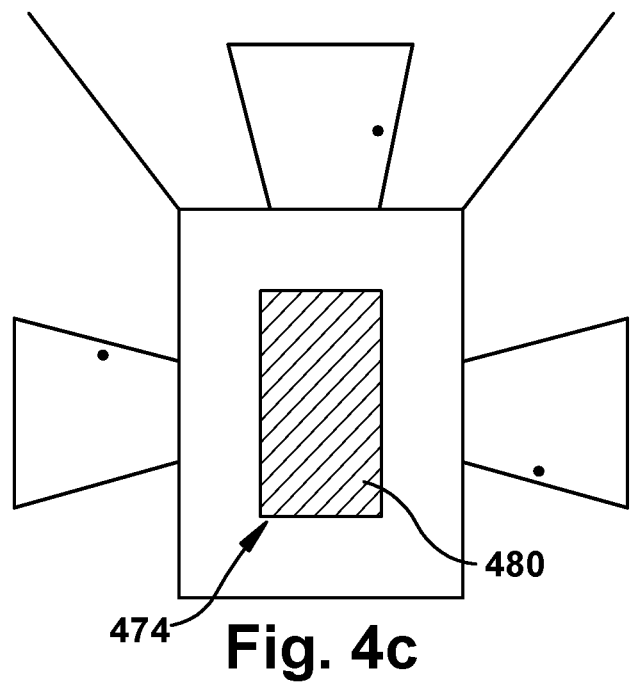

FIG. 4 is a flow chart illustrating a method 400 performed by the computer 200 of the surround view camera system 100 in accordance with an embodiment for calibrating homography matrix parameters of the individual cameras 120, 122, 124, and 126 of the example embodiment. In general, the method 400 performs a calibration process for determining a set of homography matrix parameters for each camera, wherein each homography matrix H determined separately for each camera provides the least skew error in the resultant image from that respective camera and, ultimately, the least amount of skew between camera pairs in the composite resultant image to be displayed to the operator on the display device 212 such as will be described in greater detail below. FIGS. 4a-4c are schematic perspective views of images 470, 472, and 474 of a square object 480 disposed on the fictitious floor of a fictitious hallway graphically illustrating in simple terms a progression of the skew distortion optimization set out in FIG. 4.

With continued reference back to FIG. 4, the method includes an operation at step 402, of placement of a plurality of sets of physical markers A-D, E-H, S-V, and W-Z on the ground adjacent the vehicle and they are arranged such as shown, for example, in FIGS. 1b-1e. In an example embodiment, the sets of markers include a regular repeating checkerboard type grid pattern of square markers, for example. It is advantageous to place the markers at well-separated locations in the image, disposed about the optical axis. The markers may be disposed at positions offset or otherwise spaced away from the major or main optical axis of the cameras by predetermined distances best suited for optimal calibration. At step 404, the locations of the ground plane markers A-D, E-H, S-V, and W-Z are physically measured relative to the cameras 120, 122, 124, and 126, and the positions are recorded. At step 406, the raw image obtained using a first camera is processed to undistort the raw image using one or more optimized distortion characteristic parameters determined by a distortion characteristic optimization method. In the distortion characteristic optimization method of the example embodiment, the cameras of the surround view camera system are individually calibrated in accordance with the embodiment to determine an optimal lens distortion characteristic scaling factor for each camera. In general, the raw or original images obtained by wide-angle or fish-eye lenses are distorted. The distortion can be calculated or characterized from the connection between the undistorted and the distorted field angle. The field angle is the angle formed between a light ray and the optical axis of the lens. The lenses accept incoming light rays from a typically hemispherical area, and strongly bend them inward, toward the optical axis, so as to project the hemisphere onto the imager. The relationship between the incoming light ray field angle and the outgoing light field angle is nonlinear, with large incoming field angles being bent more than small ones. Lens manufacturers typically provide a nominal lens distortion characteristic, as:

Outgoing Field Angle=function(Incoming Field Angle).

In accordance with the example embodiment herein, a scale factor which compensates for lens variations and adjusts for the lens variations, is added to this equation, as:

Outgoing Field Angle=function(Scale Factor*Incoming Field Angle).

Accordingly, the new lens characteristic is derived or otherwise calculated or determined in the surround view camera system 100 of the example embodiment by the computer system 200 (FIG. 2) from the multiplication of the original lens characteristic and the scale factor of the incoming field angle.

With continued reference to FIG. 4, the marker size, shape, and locations are measured in the image plane obtained by the first camera obtained at step 408. It is to be appreciated that at least four (4) marker points are used in the example embodiment to ensure proper calibration although any other number of marker points could be used as necessary or desired achieving commensurate calibration accuracy. In addition, matched filter correlation masks or the like may be used in this process. FIG. 4a shows an uncompensated image 470 of an example of a square physical target object 480 disposed on the floor of a hallway of a building. As can be seen, although physically square, the target object 480 has a trapezoidal shape in the uncompensated image 470.

Next, at step 410, the initial or a "default" homography matrix for the active camera being calibrated is obtained. In this step, before describing this calibration processing, the use of the expedient of a homography matrix for converting an original image to a converted image by the planar projective transformation will be considered. In this description, coordinates at each point on the original image are represented by (x, y) and coordinates of each point on the converted image are represented by (X, Y). The relation between the coordinates (x, y) on the original image and the coordinates (X, Y) on the converted image is expressed by the first of the formulas below using a homography matrix H. The homography matrix H is a 3×3 matrix and each of the elements of the matrix is expressed by $h_1$ to $h_9$. Moreover, it is convenient to set $h_9=1$ (the matrix is normalized such that $h_9=1$). From the formula, the relation between the coordinates (x, y) and the coordinates (X, Y) also can be expressed by the following formulas.

$$\begin{pmatrix} X \\ Y \\ 1 \end{pmatrix} = H \begin{pmatrix} x \\ y \\ 1 \end{pmatrix}$$
$$= \begin{pmatrix} h_1 & h_2 & h_3 \\ h_4 & h_5 & h_6 \\ h_7 & h_8 & h_9 \end{pmatrix} \begin{pmatrix} x \\ y \\ 1 \end{pmatrix}$$
$$= \begin{pmatrix} h_1 & h_2 & h_3 \\ h_4 & h_5 & h_6 \\ h_7 & h_8 & 1 \end{pmatrix} \begin{pmatrix} x \\ y \\ 1 \end{pmatrix}$$

$$X = \frac{h_1 x + h_2 y + h_3}{h_7 x + h_8 y + h_9}$$

$$Y = \frac{h_4 x + h_5 y + h_6}{h_7 x + h_8 y + h_9}$$

The homography matrix H is uniquely determined if corresponding relations of the coordinates of four or more points between the original image and the converted image are known. Once the homography matrix H is obtained, it becomes possible to convert a given point on the original image to a point on the converted image according to the above formulas. In the example embodiments herein an initial or nominal homography matrix H is received and stored in the memory 210 for later use for improvement of the image displayed to an operator of the vehicle 110.

With regard to obtaining the initial homography matrix, error values are obtained or otherwise derived related to the homography related error values. In accordance with an example embodiment, a numerical optimization function is performed to find homography matrix values that make the total registration error smaller. In one embodiment, the numerical optimization step includes a Simplex Method to improve the fidelity between the obtained image and square or rectangular templates. During the calculations, the homography matrix values are adjusted in accordance with the result obtained during the numerical optimization. Next, the raw image data is un-skewed with or using the improved homography matrix values. This image is then in turn once again tested against a known regular square or rectangular grid image to determine improved homography related calibration parameter values.

Next, at step 412, an undistorted bird's eye view is generated using the determined homography matrix and optimized lens distortion characteristic parameters.

FIG. 4*a* shows an uncompensated image 470 of the square physical target object 480, and FIGS. 4*b*, 4*c* show first and second compensated images 472, 474 of the square physical object 480 resulting from successive repetition of the compensation processing. It is of course to be appreciated that the calibration and skew compensation optimization method 400 is performed simultaneously for each of the cameras of the system 100.

Figure 5A:
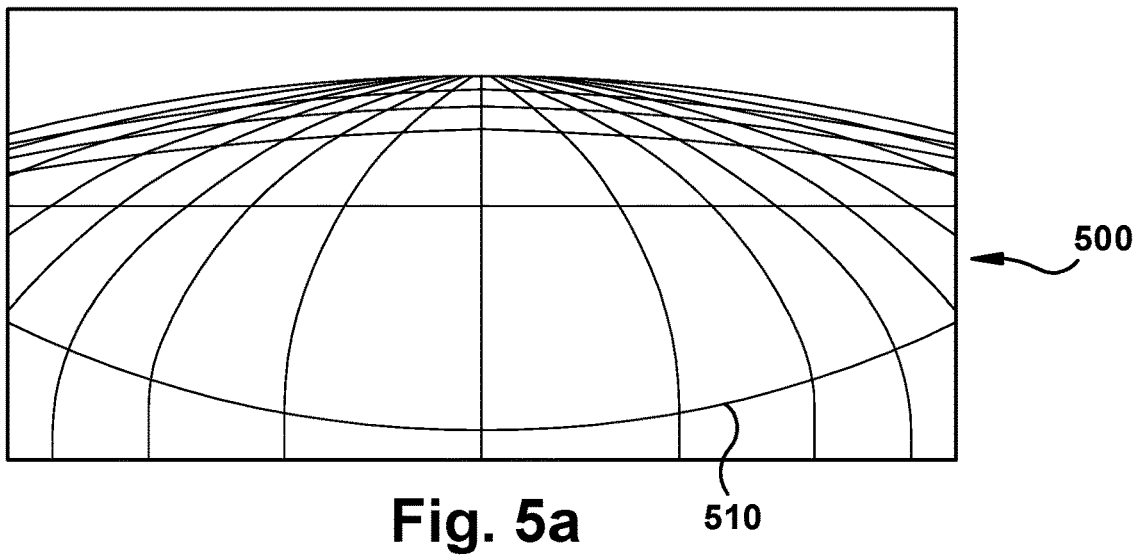
FIGS. 5a-5c are a series of views showing image processing to correct lens distortion in an original photographed image and convert the viewpoint of the image.
Figure 5B:
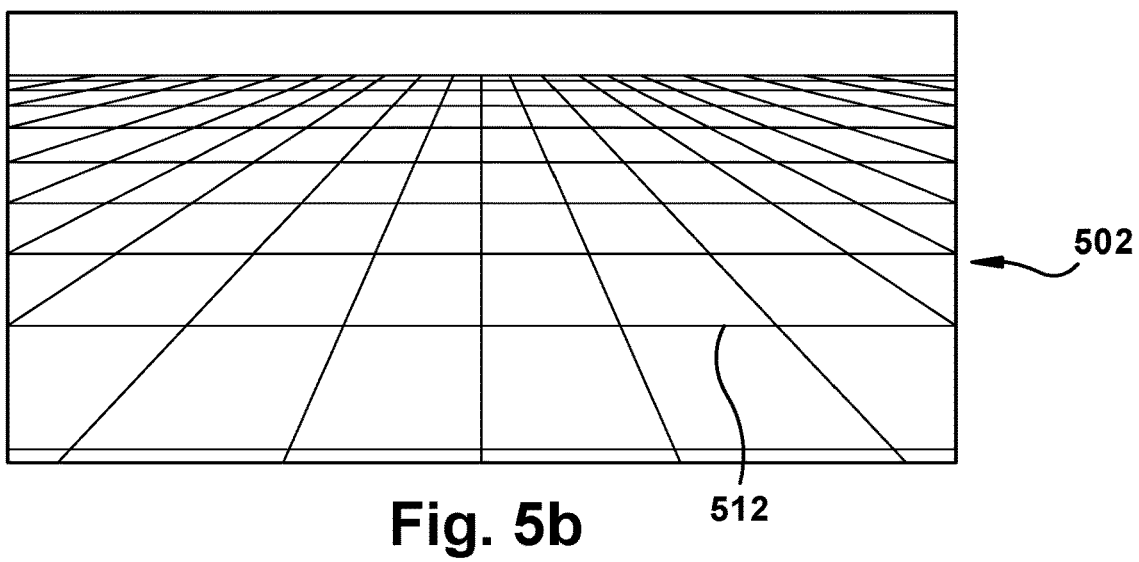

FIG. 5*a* shows an original image 500 of a rectangular region such as, for example, one or more of the calibration grid areas A-D, E-H, S-V, or W-Z (FIGS. 1*b*-1*c*) photographed by one of the cameras 122, 120, 124, and 126, respectively. Because the raw or original image 500 is obtained via a wide-angle lens, the image is generally distorted such that the center portion is enlarged and the peripheral portions are reduced as indicated by the grid lines. FIG. 5*b* shows an after-correction image 502, which is obtained by applying the lens distortion scaling optimization module 324 as described above by the system calibration unit 304. The distorted image 500 is corrected to the image 502 in accordance with the perspective, such that the perspective view from the viewpoint of the cameras 120, 122, 124, 126 is provided, as indicated by hypothetical vertical-horizontal coordinate 512 on the ground (road surface) as modified from the raw or original hypothetical virtual horizontal coordinate 510 (FIG. 5*a*). The lens distortion correction may be carried out with, for example, a pixel coordinate transformation process using a dedicated pixel transformation table. In accordance with the example embodiment, the transformation table is stored in the memory 206 and describes the relationship between the addresses of the pixels of the image before transformation and the addresses of the pixels after transformation.

Figure 5C:
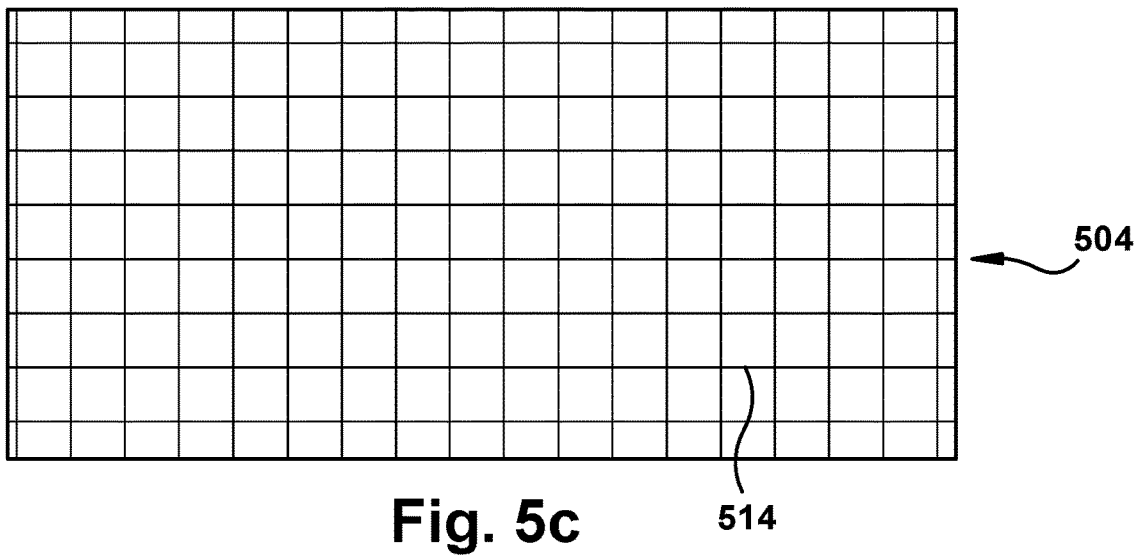

FIG. 5*c* depicts a upper viewpoint image 504, which is obtained by applying a viewpoint change process on the ground (road surface) image 502 obtained by the lens distortion correction process (FIG. 5*b*). The upper viewpoint image 504 after the viewpoint change process has a viewpoint shifted from the vehicle body to the above-the-vehicle-body, and the hypothetical coordinate 512 of FIG. 5*b* is transformed to a hypothetical rectangular coordinate 514. The viewpoint change process may be performed by a pixel coordinate transformation process with a second dedicated pixel transformation table, which is stored in the memory 206.

Figure 6:
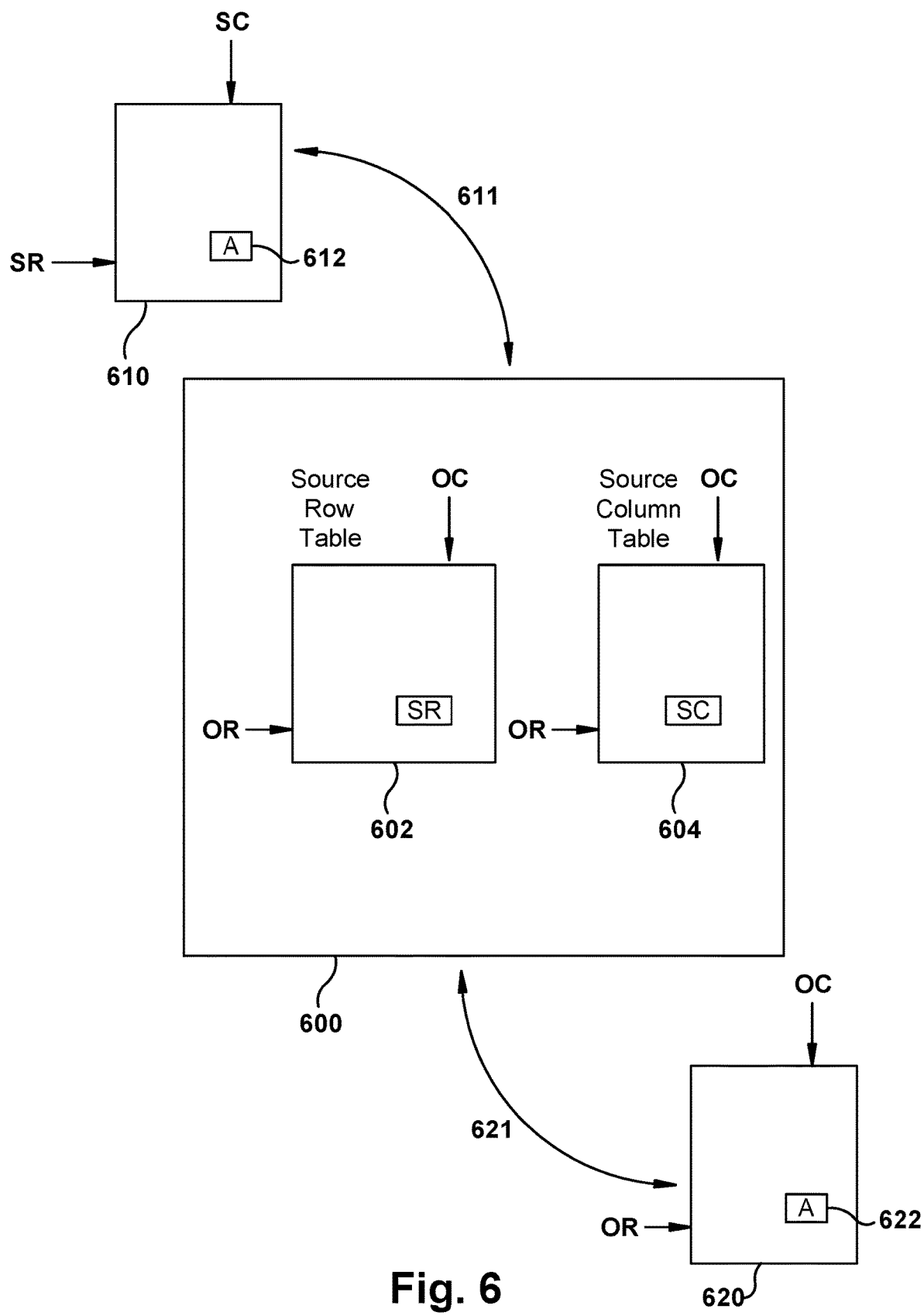
FIG. 6 illustrates use of a look up table (LUT) mapping first image data representative of a first image of the peripheral area adjacent to the associated vehicle to first display data representative of an uncompensated bird's eye view image of the peripheral area of the associated vehicle.

In accordance with the example embodiment herein, the lens distortion correction using a first dedicated pixel transformation table and the viewpoint change process (homography) using a second dedicated pixel transformation table are collapsed into a single look up table (LUT) 600 as shown in diagram form in FIG. 6. In the example embodiment, the LUT comprises a pair of tables including a Source Row Table 602 and a Source Column Table 604 for convenient fast access processing of the LUT 600 by the system 200. "Source" as used herein may be understood as pertaining to the original, distorted camera image(s). In general, however, it is to be understood that the LUT 600 is indexed 621 relative to an output pixel array 620 for human readable observation on the output display 212 and, further, is also indexed 611 relative to an input pixel array 610 of the original distorted image as obtained by the cameras 120, 122, 124, 126. The overall system shown in FIG. 6 provides for fast and easy retrieval of pixel information from the input pixel array 610 of the original distorted image directly to the output pixel array 620 for human readable observation on the output display 212 without the requirement of performing time consuming distortion correction and homography processing. Essentially, the LUT inherently includes the distortion correction and homography processing as part of its structure, whereby the time-consuming distortion correction and homography processing normally required by mathematical software or other processing algorithms is simply and advantageously bypassed in accordance with the embodiment via an indexing of the LUT 600 in a manner as will be described below.

By way of example of using the LUT 600 in accordance with an embodiment herein, in order to determine, for example, a nominal value to be displayed in the output pixel array 620 at output pixel array row OR and output pixel array column OC, both the source row table 602 as well as the source column table 604 are indexed using the output pixel array row index value OR and the output pixel array column value OC. The index into the source row table 602 using the output pixel array row OR and output pixel array column OC values yields a row pointer of the input pixel array 610, the pointer having a value SR in the example. Similarly, the index into the source column table 604 using the output pixel array row OR and output pixel array column OC values yields a column pointer of the input pixel array 610, the pointer having a value SC in the example. The value SR retrieved from the source row table 602 is used to index the input pixel array 610 at the row value indicated by SR. Similarly, the value SC retrieved from the source column 604 is used to index the input pixel array 610 at the column value indicated by SC. In this way, the nominal value A at pixel location (SR, SC) in the input pixel array 610 is directly mapped and therefore may be directly retrieved into the pixel location (OR, OC) in the output pixel array 620 as A, thereby avoiding overhead requirements of real-time distortion correction and homography processing and the like.

In accordance with the example embodiment, the processor of the surround view camera system 100 is further configured to execute code in the form of the sensitivity processing unit 306 for determining one or more sensitivities of the vehicle and of the surround view system to a corresponding one or more relationships of the vehicle relative to the peripheral area surrounding the vehicle during use therefor. Examples of one or more relationships of the vehicle relative to the peripheral area surrounding the vehicle include vehicle loading, vehicle pitch, vehicle roll, vehicle age, vehicle acceleration, suspension features of the vehicle and others as may be necessary or desired. The sensitivity processing unit 306 is operative to selectively make adjustments in the use of the LUT 600 for making corresponding adjusted use of the calibration and homography matrix parameters using techniques and method steps to be described in greater detail below.

Figure 7A:
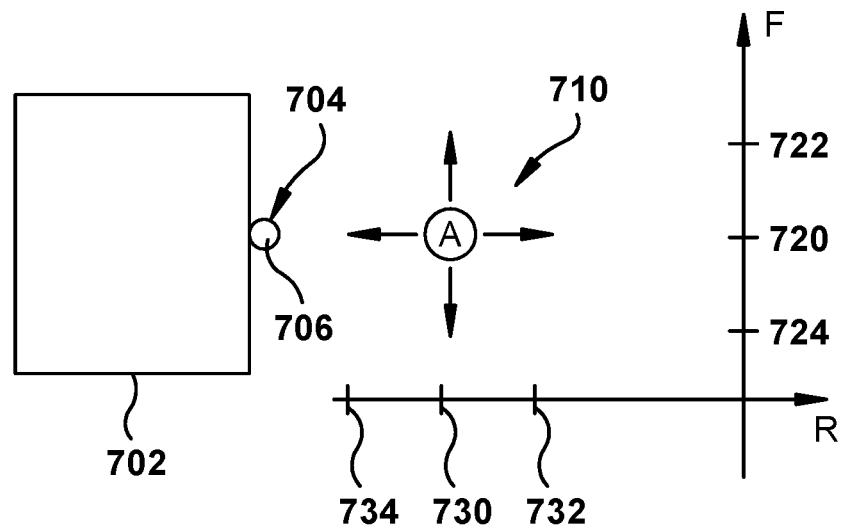
FIGS. 7a and 7b illustrate simple examples of a sensitivity adjustment.
Figure 8:
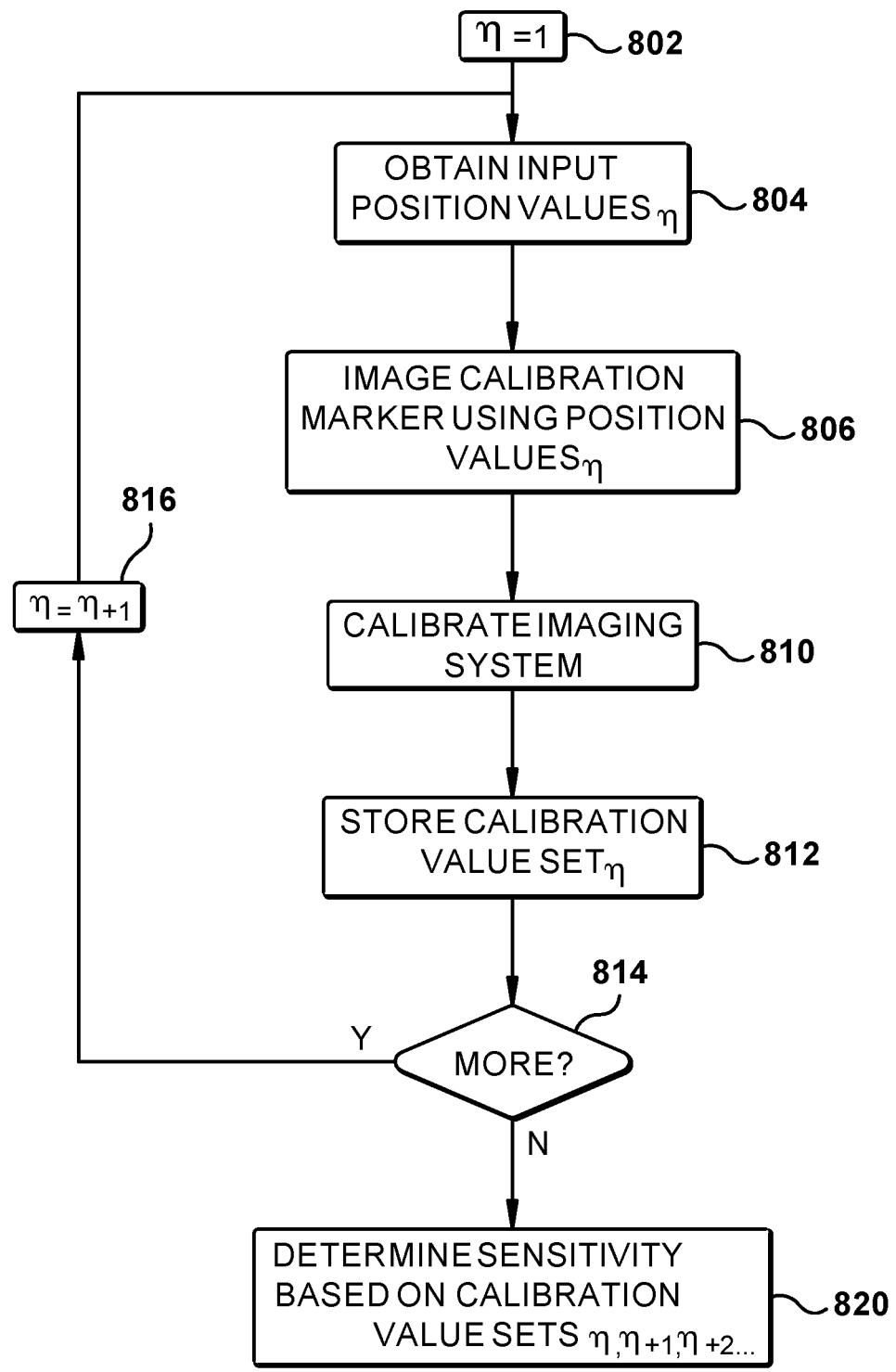
FIG. 8 illustrates a process for determining sensitivity measures.

FIG. 7*a* is a schematic top plan view of a vehicle 702 having an imaging device 704 such as a camera 706 attached to the mid-right side thereof and configured to image a calibration marker 710 disposed on the ground adjacent to the vehicle. In the physical position shown, the marker is at a first forward/aft position 720 relative to the camera and vehicle and a first right/left position 730 relative to the camera and vehicle as shown. In accordance with the example embodiment, the system sensitivity processing unit 306 performs the method shown in FIG. 8 for synthetically (without actual physical movement of the associated vehicle) determining a sensitivity of the surround view camera system 100 (shown in FIG. 7*a* as a simple single camera system for ease of illustration) to vehicle pitch, vehicle roll, and other parameters of the vehicle relative to the areas surrounding the vehicle including, for example, the ground. While for purposes of simplicity of explanation the methodology 800 of FIG. 8 is shown and described as executing serially, it is to be understood and appreciated that the example embodiment is not limited by the illustrated order, as some aspects could occur in different orders and/or concurrently with other aspects from that shown and described herein. Moreover, not all illustrated features may be required to implement the methodology 800 in accordance with the example embodiment.

The methodology 800 described herein is suitably adapted to be implemented in hardware, software, and/or any one or more combination(s) thereof. For example, the methodology 800 may be implemented by logic and/or by computer system 200 (FIG. 2) in the surround view camera system 100 described above including the processing module set 300 comprising the plural inter-operative processing modules or units for carrying out the functions of the example embodiment herein. In the example embodiment and as described below, the processor and the situational compensation unit develop sensitivity data for offsetting references to the calibration LUT by a sensitivity of the associated vehicle to relative physical changes between the associated vehicle and the peripheral area adjacent to the associated vehicle using a synthetic displacement of calibration markers imaged by the image obtaining units 232, 302 using synthetic displacements of calibration markers. It is to be appreciated that "logic," as used in the descriptions herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software stored in and/or on a non-transient memory.

At step 802 a counter parameter n is initialized to 1. At step 804 the system sensitivity processing unit 306 (FIG. 3) is provided with input position values of the calibration marker 710 such as, for example, the measured actual physical size of the calibration marker 710, the measured actual physical first forward/aft position 720 of the calibration marker 710 relative to the vehicle and/or relative to the camera 706, and the measured actual physical first right/left position 730 of the calibration marker 710 relative to the vehicle and/or relative to the camera 706 as shown. The system sensitivity processing unit 306 is also provided with an input position value h (FIG. 7*b*) of the camera 706 relative to the ground under the vehicle 702. From these values the system sensitivity processing unit 306 images the calibration marker 710 at step 806 and, at step 810, the system sensitivity processing unit 306 is initially calibrated. The initial calibration parameters are stored in the memory at step 812. It is to be appreciated that the initial calibration parameters are obtained and/or determined without physical movement of the associated vehicle as well as without synthetic movement of the associated vehicle. After the initial parameters are obtained, however, the example embodiment performs further calibration to dynamic road conditions to establish functional relationships between the raw image obtained and the image displayed by synthetic movement of the vehicle (without physical movement of the vehicle).

At step 814 it is determined whether the system sensitivity processing unit 306 is to be provided with any additional input position values of the calibration marker 710 and, if so, at step 816 the counter value n is incremented. It is to be appreciated that, in accordance with the example embodiment herein, after being provided with the physical forward/aft, left/right, and height parameters, the system is provided with one or more (preferably many) synthetic forward/aft, left/right, and height parameters for synthetically determining, without physical movement of the associated vehicle, a sensitivity of the surround view camera system 100 to vehicle pitch, vehicle roll, and other parameters of the vehicle relative to the areas surrounding the vehicle. More particularly, at step 804 the system sensitivity processing unit 306 is provided with additional input position values of the calibration marker 710 such as, for example, not the measured actual physical first forward/aft position 720 of the calibration marker 710 relative to the vehicle and/or relative to the camera 706, but instead an "artificial" or synthetic second forward/aft position 722 of the calibration marker 710 relative to the vehicle and/or relative to the camera 706 or third forward/aft position 724 of the calibration marker 710 relative to the vehicle and/or relative to the camera 706 as shown. Similarly at step 804 the system sensitivity processing unit 306 is provided with additional input position values of the calibration marker 710 such as, for example, not the measured actual physical first right/left position 730 of the calibration marker 710 relative to the vehicle and/or relative to the camera 706, but instead an "artificial" or synthetic second right/left position 732 of the calibration marker 710 relative to the vehicle and/or relative to the camera 706 or third right/left position 734 of the calibration marker 710 relative to the vehicle and/or relative to the camera 706 as shown.

In general and in accordance with the example embodiment, the direction of the synthetic displacement corresponds to the direction of compensation. For example, pitch sensitivity determination would entail a forward or aft synthetic displacement, and roll sensitivity determination would entail a left or right synthetic displacement. The system sensitivity processing unit 306 is also provided with an input position value h (FIG. 7*b*) of the camera 706 relative to the ground under the vehicle 702. From these non-physical synthetic values the system sensitivity processing unit 306 images the physical calibration marker 710 at step 806 and, at step 810, the system sensitivity processing unit 306 determines a sensitivity calibration of the imaging system and of the vehicle relative to changes in virtual marker location. The series of additional sensitivity calibration parameters are stored in the memory at step 812.

Figure 7B:
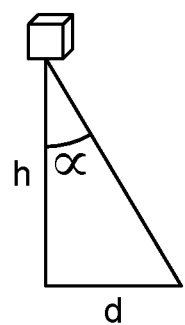

A conceptual sensitivity calculation is shown in FIG. 7*b* wherein the angle α may be calculated for a given height value h as being a height value of the camera 706 relative to the ground supporting the physical marker 710, and a given leg length d as being a physical or virtual distance of the marker from the camera in the forward/aft and right/left directions. The angle α may be calculated as the arctangent of (d/h). The amount of displacement from the nominal ground forward/aft and/or left/right positions, used to create the synthetic ground locations, is a function of the marker location, given by the nominal location of the camera during calibration (the vehicle is physically typically within some small tolerance of a nominal position).

It is to be noted that, in the example embodiment, the synthetic displacement of the ground plane markers produces a new LUT, encoding the new homography matrix and lens distortion characteristics therein. In accordance with the example embodiment, this new LUT is not stored directly, but rather the difference between the new LUT incorporating the synthetic sensitivity parameters relative to the original LUT without or prior to any sensitivity adjustments is stored. This change table, or Δ LUT, is stored as one or more sensitivity values in one or more sensitivity tables, describing how much the source row and column change, at a given display location, per unit of roll, pitch, height change, etc. of the vehicle as determined in the synthetic sensitivity calibration or analysis described above.

Figure 9A:
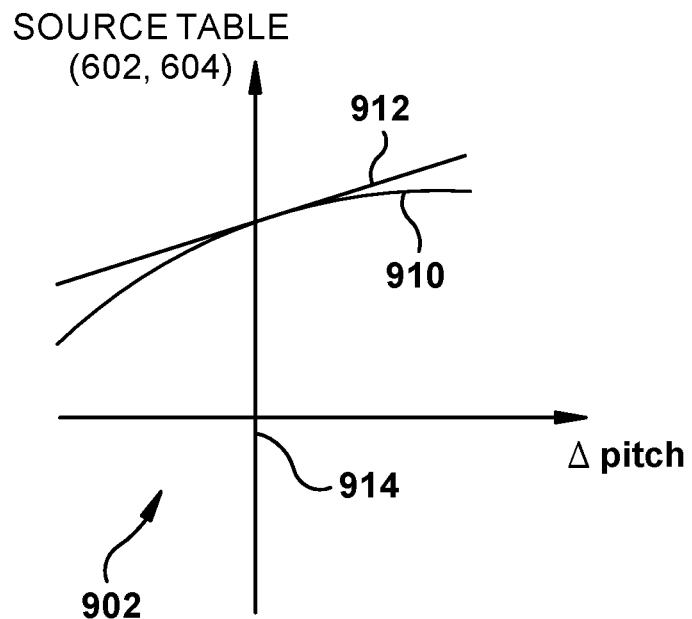
FIGS. 9a and 9b illustrate sensitivity measure linearization.
Figure 9B:
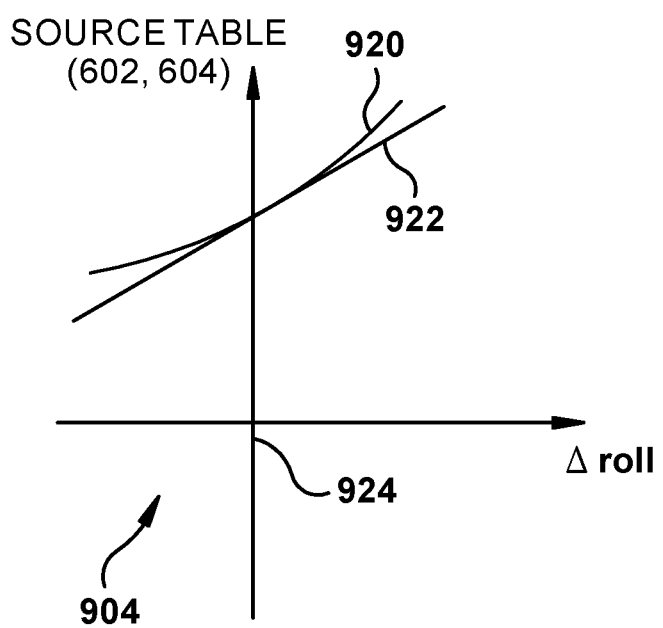

The sets of sensitivity values collected in step 820 using the method 800 described above are used in accordance with the example embodiment to provide offsets to referenced nominal pixel locations to adjust or otherwise compensate for one or more relationships of the vehicle relative to the peripheral area around the vehicle during use thereof. In accordance with a further aspect of the example embodiment, the various one or more sensitivities of the vehicle are linearized by the system linearization unit 308 as will now be described with reference to FIGS. 9a and 9b. As shown first in FIG. 9a, a pitch sensitivity curve 910 is plotted in a graph 902 in a coordinate system comprising changes of vehicle pitch plotted against the LUT 600; namely, the Source Row Table 602 and Source Column Table 604 values. In the Figure, the pitch sensitivity curve 910 is linearized by the system linearization unit 308 by approximating the pitch sensitivity curve 910 as a straight line 912 tangent to the pitch sensitivity curve 910 at a value 914 of vehicle pitch of the vehicle at rest. Similarly, as shown next in FIG. 9b, a roll sensitivity curve 920 is plotted in a graph 904 in a coordinate system comprising changes of vehicle roll plotted against the LUT 600; namely, the Source Row Table 602 and Source Column Table 604 values. In the Figure, the roll sensitivity curve 920 is linearized by the system linearization unit 308 by approximating the roll sensitivity curve 920 as a straight line 922 tangent to the roll sensitivity curve 920 at a value 924 of vehicle roll of the vehicle at rest.

Figure 10:
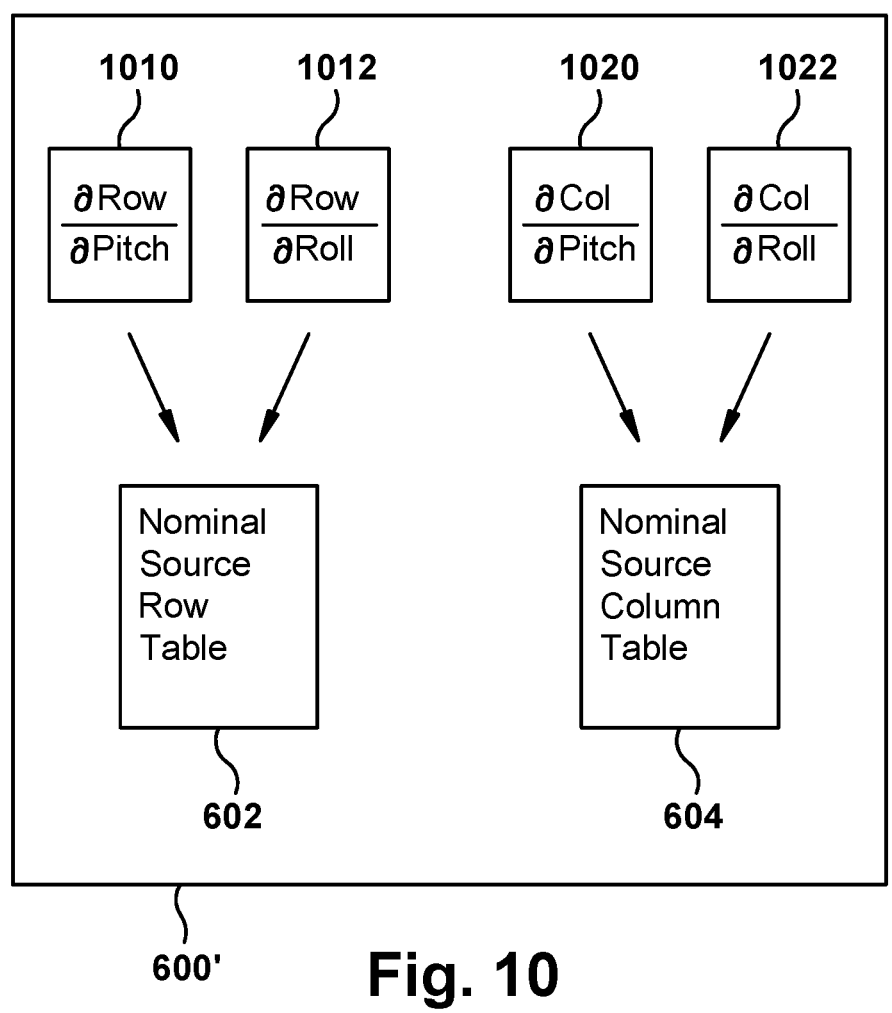
FIG. 10 shows an augmented LUT in accordance with an example embodiment.

FIG. 10 shows an augmented LUT 600' with the pair of tables described above in connection with FIG. 6 including the Source Row Table 602 and the Source Column Table 604 for convenient fast access processing of the LUT 600 by the system 200, and further including a set of four (4) motion compensation LUTs 1010, 1012, 1020, and 1022 for compensating the nominal use of the LUT 600 (FIG. 6) to include the synthetically derived and linearized sensitivity adjustments described above. In particular, the augmented LUT 600' includes a first redirecting LUT 1010 for offsetting indexes into the Source Row Table 602 in accordance with a linearization such as, for example, the linearized curve 910 of FIG. 9a, and a second redirecting LUT 1012 for offsetting indexes into the Source Row Table 602 in accordance with a linearization such as, for example, the linearized curve 920. Similarly, the augmented LUT 600' includes a third redirecting LUT 1020 for offsetting indexes into the Source Column Table 604 in accordance with a linearization such as, for example, the linearized curve 910 of FIG. 9a, and a fourth redirecting LUT 1022 for offsetting indexes into the Source Column Table 604 in accordance with a linearization such as, for example, the linearized curve 920.

In general and in accordance with the example linear embodiment:

$$\text{Adjusted\_Value} = \text{Nominal\_Source\_Value} + [\text{sensitivity}_1 \times (\Delta \text{variable}_1)] + [\text{sensitivity}_1 \times (\Delta \text{variable}_1)] + [\text{sensitivity}_2 \times (\Delta \text{variable}_2)] + \ldots [\text{sensitivity}_n \times (\Delta \text{variable}_n)].$$

By way of example of using the augmented LUT 600', in order to determine, for example, a motion compensated or otherwise adjusted value to be displayed in the output pixel array 620 at output pixel array row OR and output pixel array column OC, indices to both the source row table 602 as well as the source column table 604 are adjusted by adding values relating to the sensitivity of the vehicle to pitch and to roll in the example described above. The index into the source row table 602 using the output pixel array row OR and the output pixel array column OC values yields a nominal value SR as described above with reference to FIG. 6. Similarly, the index into the source column table 604 using the output pixel array row OR and the output pixel array column OC values yields a nominal value SC. The value SR retrieved from the source row table 602 is then augmented with values obtained from the first and second sensitivity tables 1010, 1012 and, thereafter, the augmented value of SR is used to index the input pixel array 610 at the row value indicated by the augmented value of SR. Similarly, the value SC retrieved from the source column 604 is then augmented with values obtained from the third and fourth sensitivity tables 1020, 1022 and, thereafter, the augmented value of SC is used to index the input pixel array 610 at the column value indicated by the augmented value of SC. In this way, the motion compensated or otherwise adjusted value at pixel location (SR', SC') in the input pixel array 610 is directly mapped and therefore may be directly retrieved into the pixel location (OR, OC) in the output pixel array 620, thereby avoiding the requirement of the distortion correction and homography processing, while including vehicle motion and other parameter sensitivity compensation.

In particular then relative to the example linear embodiment described:

$$\text{Adjusted\_Output\_Row\_Value} = \text{Nominal\_Source\_Row\_Value} + [\text{row\_sensitivity}_{pitch} \times (\Delta \text{pitch})] + [\text{row\_sensitivity}_{roll} \times (\Delta \text{roll})] + \ldots [\text{row\_sensitivity}_{variable\_n} \times (\Delta \text{variable}_n)].$$

$$\text{Adjusted\_Output\_Column\_Value} = \text{Nominal\_Source\_Column\_Value} + [\text{column\_sensitivity}_{pitch} \times (\Delta \text{pitch})] + [\text{column\_sensitivity}_{roll} \times (\Delta \text{roll})] + [\text{column\_sensitivity}_{variable\_n} \times (\Delta \text{variable}_n)].$$

Figure 11:
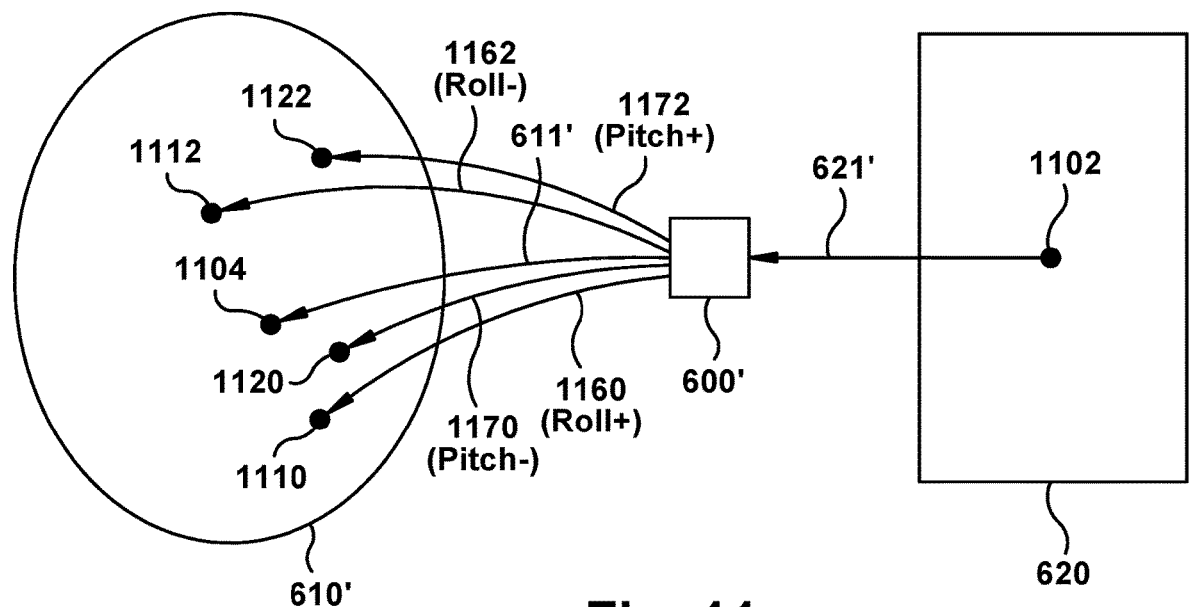
FIG. 11 is a conceptual illustration of using the augmented LUT of FIG. 10 to perform mapping adjustments between pixels of a distorted camera image and pixels rendered in an output display in accordance with variations in vehicle roll and pitch parameters.

FIG. 11 is a conceptual illustration of using the augmented LUT 600' of FIG. 10 to perform mapping adjustments between pixels of a distorted camera image and pixels rendered in an output display in accordance with variations in vehicle roll and pitch parameters. With reference now to that figure, in accordance with the example embodiment herein, the lens distortion correction using the first dedicated pixel transformation table, the viewpoint change process (homography) using the second dedicated pixel transformation table, the several sensitivity measures or tables 1010, 1012, 1020, and 1022 are collapsed into a single augmented look up table (LUT) 600' as described above and shown in diagram form in FIG. 10. In the example embodiment, the augmented LUT 600' is indexed 621' relative to an output pixel array 620 for human readable observation on the output display 212 of a selected pixel 1102 and, further, is also indexed 611' relative to an input pixel array 610' of the original distorted image as obtained by the cameras 120, 122, 124, 126. The overall system shown in FIG. 11 provides for fast and easy retrieval of the nominal values of the pixel information from the input pixel array 610' of the original distorted image directly to the output pixel array 620' for human readable observation on the output display 212 as well as information drawn from other pixel locations based on sensitivity measures or tables as described above without the requirement of performing time consuming distortion correction, homography processing, or sensitivity adjustments. Essentially, the augmented LUT 600' inherently includes the distortion correction, homography processing, and sensitivity adjustment processing as part of its structure, whereby the distortion correction and homography and sensitivity adjustment processing is simply bypassed via the indexing of the augmented LUT 600' in a manner as will be described below.

By way of a further example of using the augmented LUT 600', in order to determine, for example, a value to be displayed in the output pixel array 620' at output pixel 1102, the augmented LUT 600' is indexed in accordance with a signal from the vehicle relative position determination unit 310 (FIG. 3) that the vehicle is experiencing a "−" roll resulting in a − roll sensitivity adjusted index 1162 into the input pixel array 610' yielding the value at the − roll sensitivity adjusted pixel location 1112. Similarly, the augmented LUT 600' is indexed in accordance with a signal from the vehicle relative position determination unit 310 (FIG. 3) that the vehicle is experiencing a "+" pitch resulting in a + pitch sensitivity adjusted index 1172 into the input pixel array 610' yielding the value at the + pitch sensitivity adjusted pixel location 1122. Further, the augmented LUT 600' is indexed in accordance with a signal from the vehicle relative position determination unit 310 (FIG. 3) that the vehicle is experiencing a "+" roll resulting in a + roll sensitivity adjusted index 1160 into the input pixel array 610' yielding the value at the + roll sensitivity adjusted pixel location 1110. Yet still further, the augmented LUT 600' is indexed in accordance with a signal from the vehicle relative position determination unit 310 (FIG. 3) that the vehicle is experiencing a "−" pitch resulting in a − pitch sensitivity adjusted index 1170 into the input pixel array 610' yielding the value at the − pitch sensitivity adjusted pixel location 1120. Although the indices 1160, 1162, 1170, and 1172 were described above as operating individually for ease of discussion, it is to be understood that the indices 1160, 1162, 1170, and 1172 may operate simultaneously in the example embodiment and, further, may operate simultaneously in the example in combination with one or more other or additional sensitivity measures.

Based on the above and in accordance with the example embodiment, overall, one or more blind spot regions in areas peripheral to the vehicle are filled in. First image data representative of a first image of the peripheral area adjacent to the vehicle is received and stored in a memory together with intrinsic image coordinate transformation data comprising homography and lens distortion data representative of an intrinsic mapping between the first image data and display data representative of an uncompensated view of the peripheral area of the vehicle. The situational compensation unit is operable to selectively modify, in accordance with the above description, the intrinsic mapping as an adjusted intrinsic mapping between the first image data and the first display data in accordance with one or more signals representative of the several relationships of the vehicle relative to the peripheral area. An output signal representative of the first display data mapped from the first image data is generated and displayed on the human readable output display of the imaging system.

In the embodiment, the intrinsic image coordinate transformation data is stored in the LUTs 600, 600' mapping first coordinate pairs of the first display data with first coordinate pairs of the image data. The situational compensation unit selectively redirects access to the first image data as referenced by the LUT by the adjusted intrinsic mapping, wherein the first coordinate pairs of the first display data are mapped from second coordinate pairs of the image data different than the first coordinate pairs of the image data. In particular, in the embodiment, the situational compensation unit selectively redirects access to the first image data as referenced by the calibration LUT by offsetting one or more indexes to the nominal row and column tables in accordance with the one or more relationships of the associated vehicle relative to the peripheral area.

In addition to the above, it is to be appreciated that the one or more offset relationships for redirecting access to the LUT may be linear, quadratic or of higher order expressed as a set of values representative of one or more operating conditions of the vehicle.

Figure 12A:
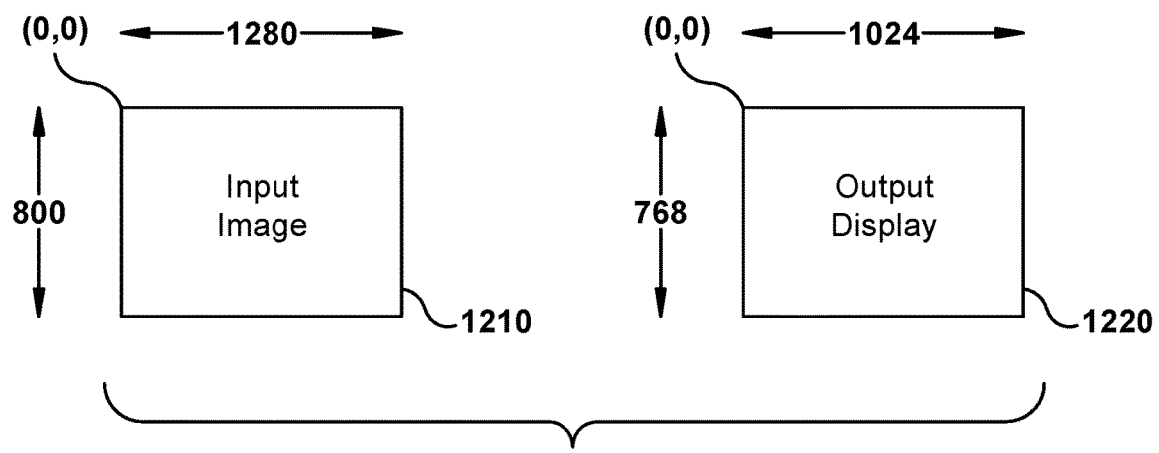
FIG. 12a is a diagrammatic illustration of an output display and of an input image in accordance with a numerical example embodiment.

In the numerical example in FIG. 12a, an input image 1210 such as for example as obtained from one or more of the cameras 120, 122, 124 or 126 has 1280 columns of pixels and 800 rows of pixels, and an output display 1220 such as for example the display 212 (FIG. 2) has 1024 columns of pixels and 768 rows of pixels. A LUT 600" shown in FIG. 12b provides a mapping in accordance with the embodiment between the 1280 columns and 800 rows of pixels of the input image 1210 and the 1024 columns and 768 rows of pixels of the output display 1220. More particularly, in accordance with the embodiment, the LUT 600" provides a mapping between a single pixel of the input image 1210 and a single pixel of the output display 1220 for providing nominal output display values drawn from the input image. It is to be appreciated that the LUT 600" of FIG. 12b is a representation of the LUT 600' of FIG. 10 comprising two (2) tables 602, 1010, 1012 and 604, 1020, 1022 combined into a single but multiple entry LUT 600" for convenience of reference and description of the example embodiment. The data within the LUT 600" need not necessarily be stored in the particular arrangement illustrated.

Using the LUT 600" of the example embodiment and as shown at W in FIG. 12b, the pixel value nominally to be displayed at output display row 404, column 25 is, according to the LUT 600', to be drawn from row 227, column 681 of the input image pixel array. Similarly, as shown at X, the pixel value nominally to be displayed at output display row 407, column 26 is, according to the LUT 600', to be drawn from row 228, column 684 of the input image pixel array. For further example and as shown at Y, the pixel value nominally to be displayed at output display row 408, column 24 is, according to the LUT 600', to be drawn from row 228, column 684 of the input image pixel array. It is to be appreciated that, in the example embodiment, the LUT 600" has 1024 columns and 768 rows of value pairs, essentially corresponding to the column and row size of the output display 1220 one-to-one.

The above nominal mapping is then, according to the example embodiment, compensated for vehicle operating parameters including but not limited to vehicle pitch, vehicle roll, vehicle loading, vehicle wear, suspension position, vehicle height relative to the ground, and other operating conditions. The compensation uses the parameters derived from the synthetic displacement compensation described above. As described above, in the general case:

$$\text{Adjusted\_Value} = \text{Nominal\_Source\_Value} + [\text{sensitivity}_1 \times (\Delta \text{variable}_1)] + [\text{sensitivity}_1 \times (\Delta \text{variable}_1)] + [\text{sensitivity}_2 \times (\Delta \text{variable}_2)] + \ldots [\text{sensitivity}_n \times (\Delta \text{variable}_n)].$$

In particular then, relative to the example embodiment using a LUT having rows and columns of value pairs, wherein the value pairs index into a source image table of nominal values for output display:

$$\text{Adjusted\_Output\_Row\_Value} = \text{Nominal\_Source\_Row\_Value} + [\text{row\_sensitivity}_{pitch} \times (\Delta \text{pitch})] + [\text{row\_sensitivity}_{roll} \times (\Delta \text{roll})] + [\text{row\_sensitivity}_{variable\_n} \times (\Delta \text{variable}_n)].$$

and $$\text{Adjusted\_Output\_Column\_Value} = \text{Nominal\_Source\_Column\_Value} + [\text{column\_sensitivity}_{pitch} \times (\Delta \text{pitch})] + [\text{column\_sensitivity}_{roll} \times (\Delta \text{roll})] + [\text{column\_sensitivity}_{variable\_n} \times (\Delta \text{variable}_n)].$$

Using the above and working towards demonstrating obtaining an output value at row 403, column 25 of the output display 1220:

$$\text{Adjusted\_Output\_Row\_403\_Value} = \text{Nominal\_Source\_Row\_227\_Value} + [\text{row\_sensitivity}_{pitch} \times (\Delta \text{pitch})] + [\text{row\_sensitivity}_{roll} \times (\Delta \text{roll})] + [\text{row\_sensitivity}_{variable\_n} \times (\Delta \text{variable}_n)].$$

and $$\text{Adjusted\_Output\_Column\_25\_Value} = \text{Nominal\_Source\_Column\_681\_Value} + [\text{column\_sensitivity}_{pitch} \times (\Delta \text{pitch})] + [\text{column\_sensitivity}_{roll} \times (\Delta \text{roll})] + [\text{column\_sensitivity}_{variable\_n} \times (\Delta \text{variable}_n)].$$

Then, if:
Row Roll Sensitivity=+0.12 pixels/degree of roll
Row Pitch Sensitivity=−0.024 pixels/degree of pitch
Column Roll Sensitivity=+0.032 pixels/degree of roll
Column Pitch Sensitivity=−0.37 pixels/degree of pitch
Using the above and demonstrating obtaining an output value at row 403, column 25 of the output display 1220, wherein the determined row and column values are rounded to the nearest integer value:

$$\text{Adjusted\_Output\_Row\_403\_Value} = \text{Nominal\_Source\_Row\_}(227 + [-0.024 \times (\Delta \text{pitch})] + [+0.12 \times (\Delta \text{roll})])$$

and $$\text{Adjusted\_Output\_Column\_25\_Value} = \text{Nominal\_Source\_Column\_}(681 + [-0.37 \times (\Delta \text{pitch})] + [+0.032 \times (\Delta \text{roll})])$$

Figure 13A:
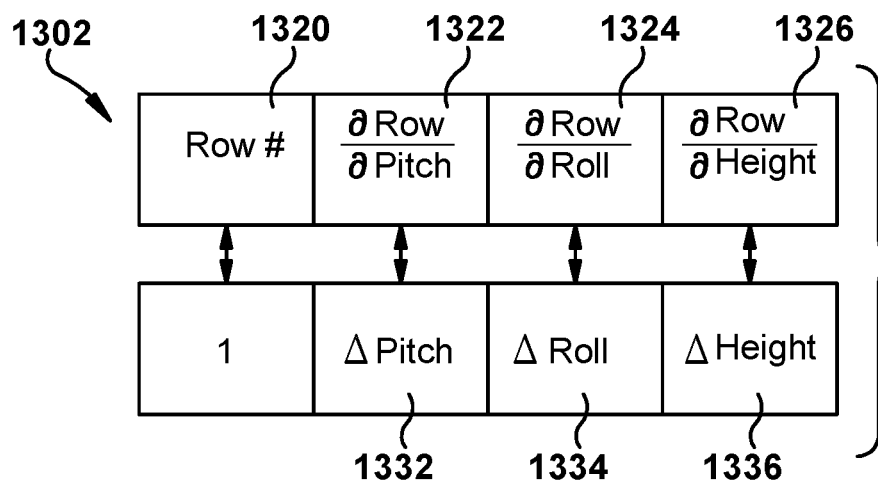
FIGS. 13a and 13b illustrate a storage scheme for locating the augmented LUT of FIG. 10 in a specialized single instruction multiple data architecture processor.
Figure 13B:
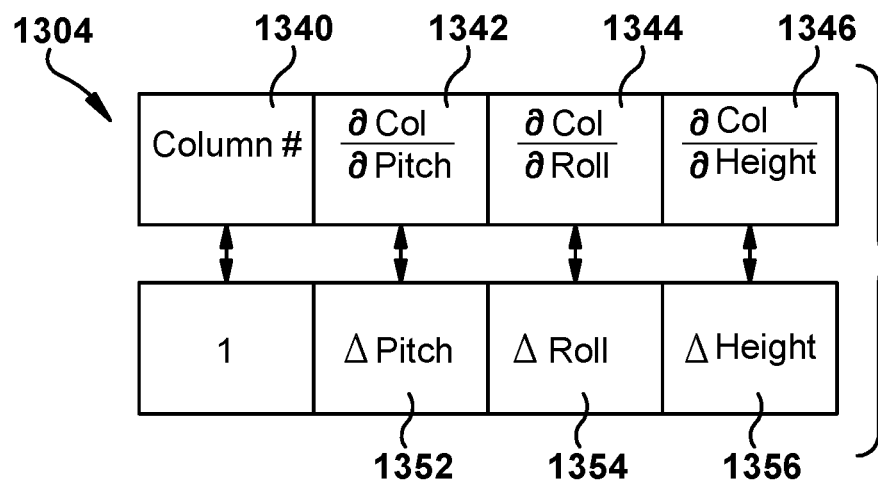

In accordance with another aspect of the example embodiment, in order to further increase the speed of the system for rendering images of the areas adjacent to the vehicle on the 112 compensated for changes in one or more relationships of the vehicle relative to the associated peripheral area, parameters described above in connection with the sensitivity adjustment and with physical vehicle monitoring are stored in a wide read memory scheme permitting simultaneous plural parallel read and multiply operations. In this regard, FIG. 13a shows a LUT row parameter storage scheme 1302 and FIG. 13b shows a LUT column parameter storage scheme 1304. In the LUT row parameter storage scheme 1302, the measure 1322 of system row sensitivity to pitch is stored adjacent (by memory address) to the measure 1324 of system row sensitivity to roll, which is stored adjacent (by memory address) to the measure 1326 of system row sensitivity to height. Similarly, a measure 1332 of a physical change in pitch of the vehicle as may be determined, for example, by the system relative position determination unit 310, is stored adjacent (by memory address) to a measure 1334 of a physical change in roll of the vehicle as determined by the system relative position determination unit 310, and to the measure 1336 of a physical change in height of the vehicle as determined by the system relative position determination unit 310. Similarly, in the LUT column parameter storage scheme 1304 of FIG. 13b, the measure 1342 of system column sensitivity to pitch is stored adjacent (by memory address) to a measure 1344 of system column sensitivity to roll is stored adjacent (by memory address) to a measure 1346 of system column sensitivity to height.

The measure 1352 of a physical change in pitch of the vehicle as may be determined, for example, by the system relative position determination unit 310, is stored adjacent (by memory address) to a measure 1354 of a physical change in roll of the vehicle as determined by the system relative position determination unit 310, and to the measure 1356 of a physical change in height of the vehicle as determined by the system relative position determination unit 310.

In the example embodiment, the LUT is stored in an ARM NEON single instruction multiple data architecture processor available from ARM Limited. The NEON architecture performs parallel multiplication and addition, enabling quick calculation of the above compensation equations. In this regard, the values 1320, 1322, 1324, and 1326 are read in a single "wide" read, and the values "1," 1332, 1334, and 1336 are read in a single "wide" read. Thereafter, the values of the first row set 1320, 1322, 1324, 1326 are multiplied with the values of the vehicle situational data set 1, 1332, 1334, 1336 in a single processor instruction. Similarly, the values of the first column set 1340, 1342, 1344, 1346 are read in a single "wide" read and, thereafter, the values of the first column set 1340, 1342, 1344, 1346 are multiplied with the values of the vehicle situational data set in a single processor instruction.

Figure 14:
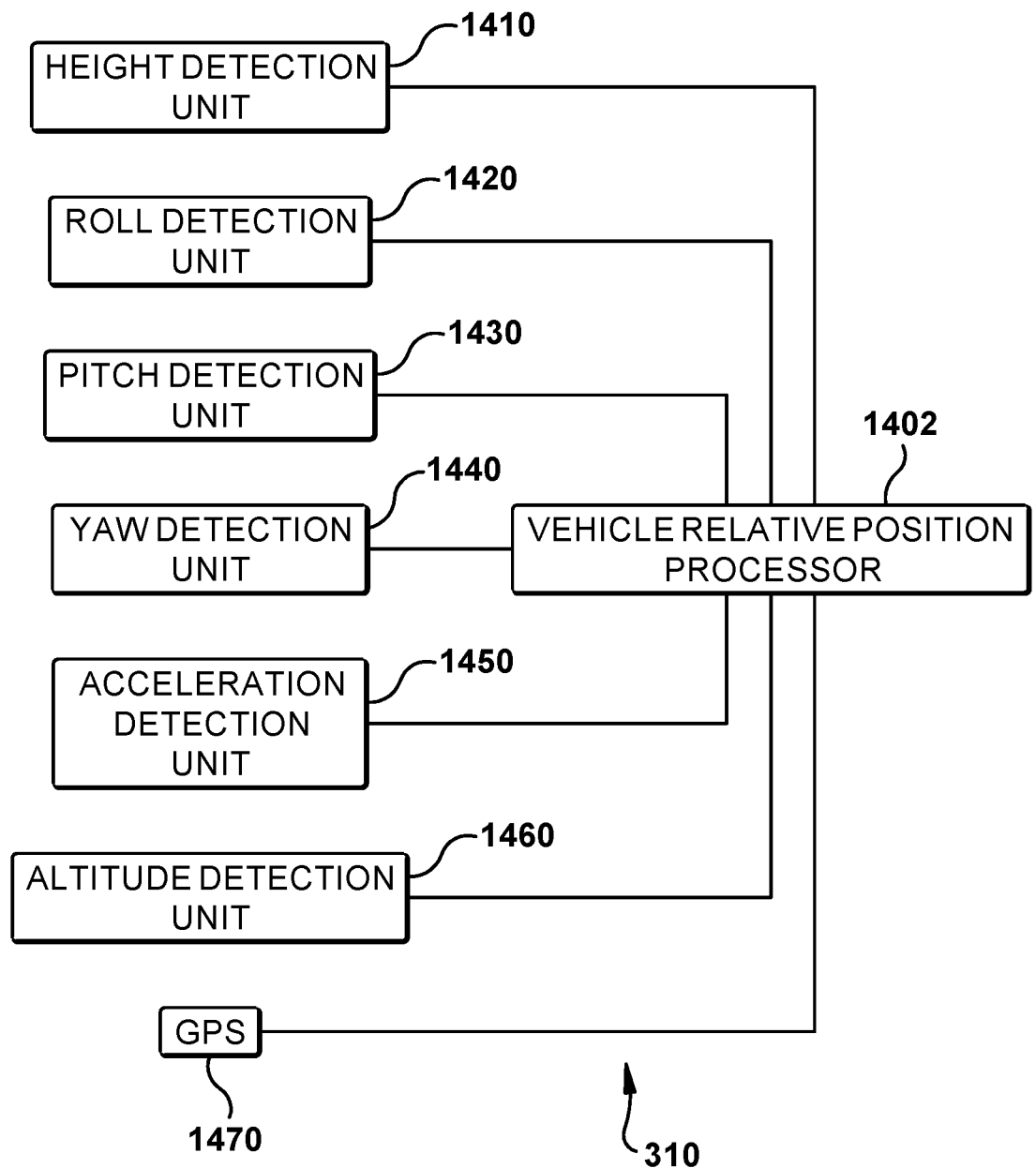
FIG. 14 is a diagrammatic illustration of the relative position determination unit of the system in accordance with the example embodiment herein.

FIG. 14 is a diagrammatic illustration of the relative position determination unit 310 of the system in accordance with the example embodiment herein. As shown there, the relative position determination unit 310 of the system includes a vehicle relative position processor 1402 operatively coupled with a set of sensor hardware and/or software modules. In particular, the vehicle relative position processor 1402 is operatively coupled with a vehicle height detection unit 1410, a vehicle roll detection unit 1420, a pitch detection unit 1430, a yaw detection unit 1440, an acceleration detection unit 1450, and altitude detection unit 1460, and with a Global position sensor (GPS) unit 1470. The vehicle relative position processor unit 310 senses real world conditions of the vehicle and provides real world signals representative of the real world conditions to the vehicle situational compensation unit 312 (FIG. 3) to reference the augmented LUT using the detected vehicle values and the corresponding sensitivities for rendering the compensated and adjusted image on the vehicle display.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

Having thus described the example embodiments, it is now claimed:

1. An imaging system adjusting a representation of images obtained of a peripheral area adjacent to an associated vehicle to compensate for relative pitch and roll movement between the associated vehicle and the peripheral area, the system comprising:

a processor;

a communication interface operatively coupled with the processor, the communication interface receiving first image data from one or more associated imaging devices attached to the associated vehicle and operatively coupled with the communication interface, the first image data being representative of a first image of the peripheral area adjacent to the associated vehicle obtained by the one or more associated imaging devices attached to the associated vehicle;

a non-transient memory operatively coupled with the processor, the non-transient memory:

storing intrinsic image coordinate transformation data in a calibration look up table (LUT) comprising a homography matrix, the intrinsic image coordinate transformation data of the calibration LUT mapping first coordinate pairs $(x_1, y_1)$ of original image data with first coordinate pairs $(X_1, Y_1)$ of converted display data, the original image data being representative of an original image of a physical pattern adjacent to the associated vehicle, and the converted display data being representative of a desired image of the physical pattern to be rendered in an output pixel array, the desired image being obtained from the original image by a planar projective transformation of the homography matrix;

storing sensitivity data in a change table ($\Delta$LUT), the sensitivity data being representative of an effect that the relative pitch and roll movement between the associated vehicle and the peripheral area has on a selected one or more of the first coordinate pairs $(X_1, Y_1)$ of the converted display data; and storing the first image data in an input pixel array as first coordinate pairs of the first image data, wherein each of the first coordinate pairs of the first image data is associated with a one of the first coordinate pairs $(x_1, y_1)$ of the original image data for selectively rendering the first image of the peripheral area adjacent to the associated vehicle in the output pixel array by indexing the calibration LUT using the first coordinate pairs $(X_1, Y_1)$ of the converted display data; and situational compensation logic stored in the non-transient memory, the situational compensation logic being executable by the processor to offset, based on the sensitivity data in the $\Delta$LUT and a signal representative of the relative pitch and roll movement between the associated vehicle and the peripheral area, the mapping by the calibration LUT of the first coordinate pairs $(X_1, Y_1)$ of the converted display data with the first coordinate pairs $(x_1, y_1)$ of the original image data to reference second coordinate pairs $(x_2, y_2)$ of the original image data different than the first coordinate pairs $(x_1, y_1)$ of the original image data when indexing the calibration LUT using the first coordinate pairs $(X_1, Y_1)$ of the converted display data, wherein an index to the calibration LUT using the first coordinate pairs $(X_1, Y_1)$ of the converted display data to be rendered in the output pixel array: i) representative of the first image of the peripheral area adjacent to the associated vehicle obtained during the relative pitch and roll movement between the associated vehicle and the peripheral area, and ii) corresponding via the calibration LUT to the first coordinate pairs $(x_1, y_1)$ of the original image data, is redirected by the situational compensation logic in accordance with the sensitivity data in the $\Delta$LUT and the signal representative of the relative pitch and roll movement to the second coordinate pairs $(x_2, y_2)$ of the first image data different than the first coordinate pairs $(x_1, y_1)$ of the first image data to render in the output pixel array adjusted converted display data based on the second coordinate pairs $(x_2, y_2)$ of the first image data different than the converted display data that would be rendered in the output pixel array by using the first coordinate pairs $(x_1, y_1)$ of the first image data, wherein the adjusted converted display data comprises the converted display data compensated by the offset for the relative pitch and roll movement between the associated vehicle and the peripheral area.

2. The imaging system according to claim 1, further comprising:

a user interface generating an output signal representative of the compensated image display data, wherein the user interface comprises a display unit displaying on a human readable output, the output signal representative of the compensated image display data.

3. The imaging system according to claim 2, wherein:

the situational compensation logic is executable by the processor to offset, based on a signal representative of relative angular movement between the associated vehicle and the peripheral area, the mapping by the calibration LUT of the first coordinate pairs $(X_1, Y_1)$ of the converted display data with the first coordinate pairs $(x_1, y_1)$ of the original image data to reference third coordinate pairs $(x_3, y_3)$ of the original image data different than the first coordinate pairs $(x_1, y_1)$ of the original image data when indexing the calibration LUT using the first coordinate pairs $(X_1, Y_1)$ of the converted display data, wherein an index to the calibration LUT using the first coordinate pairs $(X_1, Y_1)$ of the converted display data to be rendered in the output pixel array: i) representative of the first image of the peripheral area adjacent to the associated vehicle obtained during the relative angular movement between the associated vehicle and the peripheral area, and ii) corresponding via the calibration LUT to the first coordinate pairs $(x_1, y_1)$ of the original image data, is redirected by the situational compensation logic in accordance with the signal representative of the relative angular movement to the third coordinate pairs $(x_3, y_3)$ of the first image data different than the first coordinate pairs $(x_1, y_1)$ of the first image data to render in the output pixel array adjusted converted display data based on the third coordinate pairs $(x_3, y_3)$ of the first image data different than the converted display data that would be rendered in the output pixel array by using the first coordinate pairs $(x_1, y_1)$ of the first image data, wherein the adjusted converted display data comprises the converted display data compensated by the offset for the relative angular movement between the associated vehicle and the peripheral area.

4. The imaging system according to claim 1, wherein:

the situational compensation logic is executable by the processor to offset the index to the calibration LUT in accordance with a dynamic movement signal representative of a relative dynamic movement between the associated vehicle and the peripheral area adjacent to the associated vehicle.

5. The imaging system according to claim 1, wherein:
the non-transient memory stores the intrinsic image coordinate transformation data of the calibration LUT as nominal row and column tables, the nominal row table relating rows and columns of the first display data with rows and columns of the first image data and the nominal column table relating rows and columns of the first display data with rows and columns of the first image data.

6. The imaging system according to claim 5, wherein:
the situational compensation logic selectively offsets the access to the first image data as referenced by the calibration LUT by offsetting one or more indexes to the nominal row and column tables in accordance with one or more relationships of the associated vehicle relative to the peripheral area.

7. The imaging system according to claim 6, wherein the situational compensation logic selectively offsets the access to the first image data as referenced by the calibration LUT by one or more offset relationships, wherein the one or more offset relationships may be linear, quadratic, or of higher order expressed as a set values representative of one or more operating conditions of the associated vehicle.

8. The imaging system according to claim 6, wherein:
the non-transient memory comprises a plurality of logically adjacent memory locations storing selected ones of one or more relationships of the associated vehicle relative to the peripheral area logically adjacent to selected ones of the intrinsic image coordinate transformation data; and
the processor selectively executes parallel multiplication and addition operations on data stored in the logically adjacent memory locations.

9. The imaging system according to claim 5, wherein the processor and situational compensation logic operate to develop sensitivity data for offsetting references to the calibration LUT by sensitivity of the associated vehicle to relative physical changes between the associated vehicle and the peripheral area adjacent to the associated vehicle using synthetic displacement of calibration markers imaged by the one or more associated imaging devices attached to the associated vehicle.

10. A method of adjusting a representation of images obtained by an associated imaging system attached to an associated vehicle of a peripheral area adjacent to the associated vehicle to compensate for relative pitch and roll movement between the associated vehicle and the peripheral area, the method comprising:
receiving, by an image obtaining unit operatively coupled with a processor, first image data representative of a first image of the peripheral area adjacent to the associated vehicle;
storing, in a non-transient memory operatively coupled with the processor, intrinsic image coordinate transformation data in a calibration look up table (LUT) comprising a homography matrix, the intrinsic image coordinate transformation data in the calibration LUT mapping first coordinate pairs $(x_1, y_1)$ of original image data with first coordinate pairs $(X_1, Y_1)$ of converted display data, the original image data being representative of an original image of a physical pattern adjacent to the associated vehicle, and the converted display data being representative of a desired image of the physical pattern to be rendered in an output pixel array, the desired image being obtained from the original image by a planar projective transformation of the homography matrix;
storing sensitivity data in a change table (ΔLUT), the sensitivity data being representative of an effect that the relative pitch and roll movement between the associated vehicle and the peripheral area has on a selected one or more of the first coordinate pairs $(X_1, Y_1)$ of the converted display data;
storing, in the non-transient memory operatively coupled with the processor, the first image data in an input pixel array as first coordinate pairs of the first image data, wherein each of the first coordinate pairs of first image data is associated with a one of the first coordinate pairs $(x_1, y_1)$ of the original image data for selectively rendering the first image of the peripheral area adjacent to the associated vehicle in the output pixel array by indexing the calibration LUT using the first coordinate pairs $(X_1, Y_1)$ of the converted display data; and
offsetting, by a situational compensation unit operatively coupled with the processor and the non-transient memory based on the sensitivity data in the ΔLUT and a signal representative of the relative pitch and roll movement between the associated vehicle and the peripheral area, the mapping by the calibration LUT of the first coordinate pairs $(X_1, Y_1)$ of the converted display data with the first coordinate pairs $(x_1, y_1)$ of the original image data to reference second coordinate pairs $(x_2, y_2)$ of the original image data different than the first coordinate pairs $(x_1, y_1)$ of the original image data when indexing the calibration LUT using the first coordinate pairs $(X_1, Y_1)$ of the converted display data, wherein an index to the calibration LUT using the first coordinate pairs $(X_1, Y_1)$ of the converted display data to be rendered in the output pixel array i) representative of the first image of the peripheral area adjacent to the associated vehicle obtained during the relative pitch and roll movement between the associated vehicle and the peripheral area, and ii) corresponding via the calibration LUT to the first coordinate pairs $(x_1, y_1)$ of the original image data, is redirected by the situational compensation logic in accordance with the sensitivity data in the ΔLUT and the signal representative of the relative pitch and roll movement to the second coordinate pairs $(x_2, y_2)$ of the first image data different than the first coordinate pairs $(x_1, y_1)$ of the first image data to render in the output pixel array adjusted converted display data based on the second coordinate pairs $(x_2, y_2)$ of the first image data different than the converted display data that would be rendered in the output pixel array by using the first coordinate pairs $(x_1, y_1)$ of the first image data, wherein the adjusted converted display data comprises the converted display data compensated by the offset for the relative pitch and roll movement between the associated vehicle and the peripheral area.

11. The method according to claim 10, further comprising:
generating at an interface of the associated imaging system attached to the associated vehicle an output signal representative of the compensated image display data in accordance with the redirecting.

12. The method according to claim 11 further comprising:
displaying the output signal representative of the compensated image display data on a human readable output of the associated imaging system attached to the associated vehicle.

13. The method according to claim 10, further comprising:
selectively redirecting, by the situational compensation unit, index to the calibration LUT in accordance with a dynamic movement signal representative of a relative dynamic movement between the associated vehicle and the peripheral area adjacent to the associated vehicle.

14. The method according to claim 10, further comprising:
capturing, by at least one camera of the image obtaining unit, the first image data representative of the first image of the peripheral area adjacent to the associated vehicle as a sequence of image data frame sets, each image data frame set comprising rows and columns of first image data; and
storing, in the non-transient memory, the intrinsic image coordinate transformation data of the calibration LUT as nominal row and column tables, the nominal row table relating rows and columns of the first display data with rows and columns of the first image data and the nominal column table relating rows and columns of the first display data with rows and columns of the first image data.

15. The method according to claim 14, further comprising:
selectively redirecting, by the situational compensation unit, access to the first image data as referenced by the calibration LUT by offsetting one or more indexes to the nominal row and column tables in accordance with one or more relationships of the associated vehicle relative to the peripheral area.

16. The method according to claim 15, further comprising selectively redirecting, by the situational compensation unit, the access to the first image data as referenced by the LUT by one or more offset relationships, wherein the one or more offset relationships may be linear, quadratic or of higher order expressed as a set of values representative of one or more operating conditions of the associated vehicle.

17. The method according to claim 15, further comprising:
storing, in a plurality of logically adjacent memory locations of the non-transient memory, selected ones of one or more relationships of the associated vehicle relative to the peripheral area logically adjacent to selected ones of the intrinsic image coordinate transformation data; and
selectively executing, by the processor, parallel multiplication and addition operations on data stored in the logically adjacent memory locations.

18. The method according to claim 14, further comprising:
developing, by the processor and the situational compensation unit, sensitivity data for offsetting references to the calibration LUT by sensitivity of the associated vehicle to relative physical changes between the associated vehicle and the peripheral area adjacent to the associated vehicle using a synthetic displacement of calibration markers imaged by the image obtaining unit using synthetic displacements of calibration markers.

19. A non-transitory computer readable storage medium storing one or more sequences of instructions for adjusting a representation of images obtained by an associated imaging system attached to an associated vehicle of a peripheral area adjacent to the associated vehicle to compensate for relative pitch and roll movement between the associated vehicle and the peripheral area, wherein said instructions, when executed by one or more processors, cause the one or more processors to execute steps comprising:
receiving, by an image obtaining unit operatively coupled with a processor, first image data representative of a first image of the peripheral area adjacent to the associated vehicle;
storing, in a non-transient memory operatively coupled with the processor, intrinsic image coordinate transformation data in a calibration look up table (LUT) comprising a homography matrix, the intrinsic image coordinate transformation data in the calibration LUT mapping first coordinate pairs $(x_1, y_1)$ of original image data with first coordinate pairs $(X_1, Y_1)$ of converted display data, the original image data being representative of an original image of a physical pattern adjacent to the associated vehicle, and the converted display data being representative of a desired image of the physical pattern to be rendered in an output pixel array, the desired image being obtained from the original image by a planar projective transformation of the homography matrix;
storing sensitivity data in a change table ($\Delta$LUT), the sensitivity data being representative of an effect that the relative pitch and roll movement between the associated vehicle and the peripheral area has on a selected one or more of the first coordinate pairs $(X_1, Y_1)$ of the converted display data;
storing, in the non-transient memory operatively coupled with the processor, the first image data in an input pixel array as first coordinate pairs of the first image data, wherein each of the first coordinate pairs of first image data is associated with a one of the first coordinate pairs $(x_1, y_1)$ of the original image data for selectively rendering the first image of the peripheral area adjacent to the associated vehicle in the output pixel array by indexing the calibration LUT using the first coordinate pairs $(X_1, Y_1)$ of the converted display data; and
offsetting, by a situational compensation unit operatively coupled with the processor and the non-transient memory based on the sensitivity data in the $\Delta$LUT and a signal representative of the relative pitch and roll movement between the associated vehicle and the peripheral area, the mapping by the calibration LUT of the first coordinate pairs $(X_1, Y_1)$ of the converted display data with the first coordinate pairs $(x_1, y_1)$ of the original image data to reference second coordinate pairs $(x_2, y_2)$ of the original image data different than the first coordinate pairs $(x_1, y_1)$ of the original image data when indexing the calibration LUT using the first coordinate pairs $(X_1, Y_1)$ of the converted display data,
wherein an index to the calibration LUT using the first coordinate pairs $(X_1, Y_1)$ of the converted display data to be rendered in the output pixel array i) representative of the first image of the peripheral area adjacent to the associated vehicle obtained during the relative pitch and roll movement between the associated vehicle and the peripheral area, and ii) calibration LUT corresponding via the to the first coordinate pairs $(x_1, y_1)$ of the original image data, is redirected by the situational compensation logic in accordance with the sensitivity data in the $\Delta$LUT and the signal representative of the relative pitch and roll movement to the second coordinate pairs $(x_2, y_2)$ of the first image data different than the first coordinate pairs $(x_1, y_1)$ of the first image data to render in the output pixel array adjusted converted display data based on the second coordinate pairs $(x_2, y_2)$ of the first image data different than the converted display data that would be rendered in the output pixel array using the first coordinate pairs $(x_1, y_1)$ of the first image data, wherein the adjusted converted display data comprises the converted display data compensated by the offset for the relative pitch and roll movement between the associated vehicle and the peripheral area.

20. The non-transitory computer readable storage medium according to claim 19, further comprising:
generating at an interface of the associated imaging system attached to the associated vehicle an output signal representative of the compensated image display data in accordance with the redirecting.

21. The non-transitory computer readable storage medium according to claim 20 further comprising:
displaying the output signal representative of the compensated image display data on a human readable output of the associated imaging system attached to the associated vehicle.

22. The non-transitory computer readable storage medium according to claim 19, further comprising:
selectively redirecting, by the situational compensation unit, index to the calibration LUT in accordance with a dynamic movement signal representative of a relative dynamic movement between the associated vehicle and the peripheral area adjacent to the associated vehicle.

23. The non-transitory computer readable storage medium according to claim 19, further comprising:
capturing, by at least one camera of the image obtaining unit, the first image data representative of the first image of the peripheral area adjacent to the associated vehicle as a sequence of image data frame sets, each image data frame set comprising rows and columns of first image data; and
storing, in the non-transient memory, the intrinsic image coordinate transformation data of the calibration LUT as nominal row and column tables, the nominal row table relating rows and columns of the first display data with rows and columns of the first image data and the nominal column table relating rows and columns of the first display data with rows and columns of the first image data.

24. The non-transitory computer readable storage medium according to claim 23, further comprising:
selectively redirecting, by the situational compensation unit, access to the first image data as referenced by the calibration LUT by offsetting one or more indexes to the nominal row and column tables in accordance with one or more relationships of the associated vehicle relative to the peripheral area.

25. The non-transitory computer readable storage medium according to claim 24, further comprising selectively redirecting, by the situational compensation unit, the access to the first image data as referenced by the LUT by one or more offset relationships, wherein the one or more offset relationships may be linear, quadratic or of higher order expressed as a set of values representative of one or more operating conditions of the associated vehicle.

26. The non-transitory computer readable storage medium according to claim 24, further comprising:
storing, in a plurality of logically adjacent memory locations of the non-transient memory, selected ones of one or more relationships of the associated vehicle relative to the peripheral area logically adjacent to selected ones of the intrinsic image coordinate transformation data; and
selectively executing, by the processor, parallel multiplication and addition operations on data stored in the logically adjacent memory locations.

27. The non-transitory computer readable storage medium according to claim 23, further comprising:
developing, by the processor and the situational compensation unit, sensitivity data for offsetting references to the calibration LUT by sensitivity of the associated vehicle to relative physical changes between the associated vehicle and the peripheral area adjacent to the associated vehicle using a synthetic displacement of calibration markers imaged by the image obtaining unit using synthetic displacements of calibration markers.

* * * * *